United States Patent
Patel et al.

(10) Patent No.: US 12,207,013 B2
(45) Date of Patent: Jan. 21, 2025

(54) SYSTEMS AND METHODS FOR DOWN-SAMPLED VIDEO ROUTING

(71) Applicant: Evertz Microsystems Ltd., Burlington (CA)

(72) Inventors: Rakesh Thakor Patel, Mississauga (CA); Jeff Wei, Richmond Hill (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

(21) Appl. No.: 17/362,278

(22) Filed: Jun. 29, 2021

(65) Prior Publication Data

US 2022/0070387 A1    Mar. 3, 2022

Related U.S. Application Data

(60) Provisional application No. 63/072,265, filed on Aug. 31, 2020.

(51) Int. Cl.
*H04N 5/268* (2006.01)
*H04N 21/2343* (2011.01)

(52) U.S. Cl.
CPC ......... *H04N 5/268* (2013.01); *H04N 21/2343* (2013.01)

(58) Field of Classification Search
CPC ............................ H04N 5/268; H04N 21/2343
(Continued)

(56) References Cited

U.S. PATENT DOCUMENTS

| 5,162,904 A | 11/1992 | Beaulier et al. |
| 5,889,775 A | 3/1999 | Sawicz et al. |

(Continued)

FOREIGN PATENT DOCUMENTS

| CA | 2866073 A1 | 4/2015 |
| WO | 9917547 A1 | 4/1999 |

(Continued)

OTHER PUBLICATIONS

Computer Graphics (SIGGRAPH '83 Proceedings) vol. 17, No. 3, published in Jul. 1983 and titled "Pyramidal Parametrics"; pp. 1-11.
(Continued)

*Primary Examiner* — Nathan J Flynn
*Assistant Examiner* — Caroline Somera
(74) *Attorney, Agent, or Firm* — SMART & BIGGAR LP

(57) ABSTRACT

A media router for down-sampled video routing is provided. The media router includes input cards, cross-point cards and output cards. The input cards include input terminals to receive high bandwidth video signals, a compression module to compress the high bandwidth video signals to generate low bandwidth video signals, and output terminals to transmit the low bandwidth video signals. The cross-point cards include input ports to receive the low bandwidth video signals generated by the input cards, output ports to transmit the low bandwidth video signals, and a cross-point switch for routing the low bandwidth video signals between the input ports and a designated output port. The output cards include input ports to receive the compressed video signal from a cross-point card, a decompression module for converting the compressed video signal into an uncompressed video signal, and output ports for transmitting the uncompressed video signal.

16 Claims, 9 Drawing Sheets

(58) Field of Classification Search
USPC .......................................................... 725/148
See application file for complete search history.

(56) References Cited

U.S. PATENT DOCUMENTS

| | | | |
|---|---|---|---|
| 5,982,456 | A | 11/1999 | Smith et al. |
| 6,292,229 | B1 | 9/2001 | Meyer |
| 6,404,811 | B1 | 6/2002 | Cvetko et al. |
| 6,601,210 | B1 | 7/2003 | Kagan |
| 6,950,391 | B1* | 9/2005 | Zadikian ............ H04Q 11/0005 370/219 |
| 6,973,026 | B1 | 12/2005 | Dyrga et al. |
| 6,976,134 | B1 | 12/2005 | Lolayekar et al. |
| 7,012,895 | B1 | 3/2006 | Mir |
| 7,039,048 | B1 | 5/2006 | Monta et al. |
| 7,058,009 | B1 | 6/2006 | Skirmont et al. |
| 7,194,550 | B1 | 3/2007 | Chamdani et al. |
| 7,236,488 | B1 | 6/2007 | Kavipurapu |
| 7,657,916 | B2 | 2/2010 | Rodriguez et al. |
| 7,756,118 | B2 | 7/2010 | Harmon et al. |
| 7,873,056 | B2 | 1/2011 | Higuchi et al. |
| 7,920,151 | B2 | 4/2011 | Macinnis et al. |
| 8,194,561 | B2 | 6/2012 | Kogata et al. |
| 8,233,477 | B1 | 7/2012 | Goergen et al. |
| 8,537,838 | B2 | 9/2013 | Patel et al. |
| 8,631,172 | B2 | 1/2014 | Greenhalgh |
| 8,776,161 | B2 | 7/2014 | Gazier et al. |
| 8,798,045 | B1 | 8/2014 | Aybay et al. |
| 8,891,406 | B1 | 11/2014 | Shekhar |
| 8,891,963 | B2* | 11/2014 | Patel ....................... H04M 3/56 398/43 |
| 9,258,253 | B2 | 2/2016 | Subramanian et al. |
| 9,479,711 | B2 | 10/2016 | Liron |
| 9,510,092 | B2 | 11/2016 | Butters |
| 9,654,391 | B2 | 5/2017 | Patel |
| 9,942,139 | B2 | 4/2018 | Patel |
| 10,164,877 | B2 | 12/2018 | Patel |
| 10,587,506 | B2 | 3/2020 | Patel |
| 2002/0008780 | A1 | 1/2002 | Han |
| 2002/0031125 | A1 | 3/2002 | Sato |
| 2002/0056125 | A1 | 5/2002 | Hodge et al. |
| 2002/0059623 | A1 | 5/2002 | Rodriguez et al. |
| 2003/0039398 | A1* | 2/2003 | McIntyre ............. H04N 19/164 375/E7.017 |
| 2003/0079019 | A1 | 4/2003 | Lolayekar et al. |
| 2003/0101426 | A1 | 5/2003 | Sarkinen et al. |
| 2003/0227926 | A1 | 12/2003 | Ramamurthy et al. |
| 2005/0076134 | A1 | 4/2005 | Bialik et al. |
| 2006/0092952 | A1 | 5/2006 | Boutros et al. |
| 2007/0083594 | A1* | 4/2007 | Ludwig ............... H04L 12/1818 709/204 |
| 2009/0201988 | A1* | 8/2009 | Gazier ................... H04N 19/40 375/240.06 |
| 2012/0020373 | A1 | 1/2012 | Subramanian et al. |
| 2012/0179742 | A1* | 7/2012 | Acharya .......... H04N 21/23116 709/202 |
| 2013/0121692 | A1* | 5/2013 | Patel ....................... H04M 3/56 398/45 |
| 2014/0282776 | A1 | 9/2014 | De Vriendt et al. |
| 2014/0301462 | A1* | 10/2014 | Gu ....................... H04N 19/176 375/240.12 |
| 2015/0016243 | A1 | 1/2015 | Haugen |
| 2015/0092771 | A1* | 4/2015 | Patel ..................... H04L 49/101 370/362 |
| 2015/0288919 | A1* | 10/2015 | Labosco ................ H04N 19/40 348/445 |
| 2016/0021430 | A1* | 1/2016 | LaBosco .......... H04N 21/64322 725/31 |
| 2016/0248989 | A1* | 8/2016 | Cross ................. H04N 21/2385 |
| 2017/0279711 | A1 | 9/2017 | Patel |
| 2019/0081893 | A1* | 3/2019 | Patel ....................... H04L 45/60 |
| 2019/0121341 | A1* | 4/2019 | Cella .................. G05B 23/0264 |
| 2020/0220813 | A1 | 7/2020 | Patel |

FOREIGN PATENT DOCUMENTS

| | | | |
|---|---|---|---|
| WO | 0016560 | A1 | 3/2000 |
| WO | 03036501 | A1 | 5/2003 |

OTHER PUBLICATIONS

Schulzrinne, et al. RFC No. 1889, published in Jan. 1996 and titled "RTP: A Transport Protocol for Real-Time Applications", pp. 1-75.

ACM Multimedia protocol, published in Oct. 2001 and titled "Scalable Streaming of JPEG2000 Images using Hypertext Transfer", 9 pages.

Proc. Int. Conf. on Image Processing, vol. 1, published in Sep. 2002 and titled "Remote Browsing of JPEG 2000 Images", pp. I-229 to I-232 (4 pages).

RFC No. 3190, published in Jan. 2002 and titled "RTP Payload Format for 12-bit DAT Audio and 20- and 24-bit Linear Sampled Audio", pp. 1-17.

Visual Communications and Image Processing presentation, presented in 2003 and titled "Architecture, Philosophy and Performance of JPIP: Internet Protocol", 15 pages.

RFC No. 3497, published in Mar. 2003 and titled "RTP Payload Format for Society of Motion Picture and Television Engineers (SMPTE) 292M Video", pp. 1-12.

RFC No. 3551, published in Jul. 2003 and titled "RTP Profile for Audio and Video Conferences with Minimal Control", pp. 1-38.

RFC No. 3550, published in Jul. 2003 and titled "RTP: A Transport Protocol for Real-Time Applications", pp. 1-89.

RFC No. 4175, published in Sep. 2005 and titled "RTP Payload Format for Uncompressed Video", pp. 1-14.

RFC No. 4855, published in Feb. 2007 and titled "Media Type Registration of RTP Payload Formats", pp. 1-11.

VSF vol. 7, No. 1, published in Feb. 2007 and discussing work on the SMPTE ST 2022 standard on video over IP. 6 pages.

SMPTE ST 2022-2:2007, published in May 2007 and titled "Unidirectional Transport of Constant Bit Rate MPEG-2 Transport Streams on IP Networks". 9 pages.

VSF vol. 9, No. 1, published in Apr. 2008 and discussing work on SMPTE ST 2022-6 standard on high bit rate audio video over IP "HBRAV-IP" transport. 5 pages.

VSF vol. 13, No. 1, published in Jun. 2010 and discussing work on SMPTE ST 2022-6 on high bit rate media transport "HBRMT" encapsulation. 6 pages.

SMPTE ST 2022-6:2012, published in Oct. 2012 and titled "Transport of High Bit Rate Media Signals over IP Networks—HBRMT". 16 pages.

Labbs, Matthias, EBU (European Broadcasting Union) Whitepaper, published in Nov. 2012 and titled "SDI over IP—seamless signal switching in SMPTE 2022-6 and a novel multicast routing concept", pp. 1-7.

EBU Whitepaper, published in Apr. 2014 and titled "Ultra High Definition TV Over IP Networks", 11 pages.

VSF TR-03, published in Nov. 2015 and titled "Transport of Uncompressed Elementary Stream Media over IP", 22 pages.

Bits By The Bay SMPTE Technology Conference presentation, published and presented in May 2016 and titled "Video Transport and Synchronization", pp. 1-99.

RFC No. 8331, published in Feb. 2018 and titled "RTP Payload for Society of Motion Picture and Television Engineers (SMPTE) ST 291-1 Ancillary Data", pp. 1-22.

2017 VSF October Meeting Series—Arlington, Virginia, USA. (http://www.videoservicesforum.org/events_archive/2017-10_MtgSeries-ArlingtonVA.shtml). Oct. 3 & 4, 2017.

VidTrans16—Content in Motion, Annual Technical Conference and Exposition—New Orleans, Louisiana, USA (http://www.videoservicesforum.tv/events_archive/2016-02_VidTrans16-NOLA.shtml). Feb. 23-Feb. 25, 2016.

VSF TR-05, published in Jun. 2018 and titled Essential Formats and Descriptions for Interoperatbility of SMPTE ST 2110-20 Video Signals. Jun. 23, 2018. 19 pages.

Axis, "200 User's Manual", Rev. 1.6, Part No. 14978, Oct. 1998, 107 pages.

(56) References Cited

OTHER PUBLICATIONS

Grass Valley, "Trinix Digital Video Router Planning and Installation Manual", Software Version 2.4.1, issued Aug. 4, 2007, 232 page.
Miranda (Grass Valley), " NV920 Control System QuickStart Guide", published Apr. 29, 2013, 11 pages.
Grass Valley, "TRINIX Broadlinx Software Release Notes", Software Version 3.2.0, published Mar. 2011, 32 pages.
Grass Valley, "Encore Control System Installation and Service Manual", Software Version 1.8.1, published Mar. 2011, 124 pages.
Grass Valley Group, "Encore Control System Software Release Notes Addendum", Software release 1.5.2, published Jun. 2002, revised Nov. 2002, 6 pages.
Leitch Inc., "Integrator Series High Definition Switcher Matrix Module Set Instruction Manual", published Feb. 1999, 30 pages.
Leitch Inc., "Integrator Large Routing Systems Brochure", published Apr. 2001, 8 pages.
Mellanox Technologies, "Introduction to InfiniBand"—White Paper, published 2003, 20 pages.
Cisco Press, Dave Hucaby, Steve McQuerry, "Field Manual: Catalyst Switch Configuration", published Sep. 6, 2002, 560 pages.
Cisco Systems, "Catalyst 6000 and 6500 Series Architecture"—Whitepaper, published Jul. 2001, 20 pages.
Cisco Systems, "Cisco Products Quick Reference Guide", published Apr. 2003, 238 pages.
Grass Valley, "Kalypso Installation Planning Guide", published Jun. 2004, 88 pages.
Grass Valley, "Kayenne Comparison Guide", published 2011, 2 pages.
Grass Valley, "Kayenne Installation & Service Manual"—Version 14.3, published Apr. 4, 2019, pp. 1-158.
Grass Valley, "Kayenne Installation & Service Manual"—Version 14.3, published Apr. 4, 2019, pp. 159-395.
Grass Valley, "Kalypso Video Production Center Data Sheet", published 2003, 4 pages.
Grass Valley, "Encore Control System—Installation and Service Manual"—Software Version 1.7.4.1, published Oct. 2009, pp. 1-198.
Grass Valley, "Encore Control System—Installation and Service Manual"—Software Version 1.7.4.1, published Oct. 2009, pp. 199-354.

* cited by examiner

SYSTEMS AND METHODS FOR DOWN-SAMPLED VIDEO ROUTING

CROSS-REFERENCE TO RELATED APPLICATIONS

This application claims the benefit of U.S. provisional Application No. 63/072,265 filed on Aug. 31, 2020, which is incorporated by reference herein in its entirety.

FIELD

The described embodiments relate to routing of video streams, and in particular, to systems and methods for routing of down-sampled video streams.

BACKGROUND

The following paragraph is not an admission that anything discussed therein is prior art or part of the knowledge of persons skilled in the art.

Routers are often deployed in media processing systems to route media streams between various devices including media source devices (e.g., cameras and microphones), media destination devices (e.g., display devices) and intermediate media processing devices (e.g., video and/or audio synchronization or equalization modules). The media processing systems can range from simple television sets, to large and complex broadcast production systems. In general, media streams can contain one or more of video content, audio content and ancillary data content (e.g., vertical ancillary data (VANC) or horizontal ancillary data (HANC)).

In recent years, there has been an increasing demand for transmission of high resolution, high bandwidth digital video content. This includes 4K, 8K, 16K and/or 32K Ultra High Definition (UHD) video streams. Transmission of uncompressed high bandwidth video streams, however, often demands high data transmission rates which may not be supported by older media routing systems. This is typically owing to the integrated circuitry (IC) used in these routers, which may not tolerate routing of media streams having high data transmission rates. In various cases, it has been necessary to incur expensive and inconvenient upgrades to replace older routers with more complex and advanced routing systems capable of routing high bandwidth digital video signals.

SUMMARY OF VARIOUS EMBODIMENTS

The various embodiments described herein generally relate to systems and methods for down-sampled video routing.

In at least one broad aspect, there is provided a media router for down-sampled video routing. The media router comprises: a backplane including a plurality of backplane connections; at least one input card, comprising: one or more input terminals to receive at least one high bandwidth video signal; at least one compression module to compress the at least one high bandwidth video signal to generate at least one low bandwidth video signal; and one or more output terminals being electrically coupled to the backplane, and configured to transmit the at least one low bandwidth video signal to the backplane; at least one cross-point card, comprising: one or more input ports coupled to the backplane to receive the at least one low bandwidth video signal generated by the at least one input card; one or more output ports coupled to the backplane to transmit the at least one low bandwidth video signal; and a cross-point switch for routing the at least one low bandwidth video signal between the one or more input ports and a designated output port, of the one or more output ports; at least one output card, comprising: one or more input ports coupled to the backplane to receive the at least one low bandwidth video signal from a cross-point card; at least one decompression module for converting the received at least one low bandwidth video signal into at least one recovered high bandwidth uncompressed video signal; and one or more output ports for transmitting the at least one recovered high bandwidth uncompressed video signal.

In some embodiments, each of the one or more cross-point cards has a card bandwidth limit.

In some embodiments, the high bandwidth video signal has a bandwidth greater than the card bandwidth limit, and the low bandwidth video signal has a bandwidth less than or equal to the card bandwidth limit.

In some embodiments, the card bandwidth limit is approximately in a range of 3 Gbit/s to 3.5 Gbits/s.

In some embodiments, the media router further comprises a controller coupled to each of the at least one input card and the at least one output card, wherein the controller is configured to control a compression scheme of the at least one compression module in the at least one input card, and a decompression scheme of the at least decompression module in the at least one output card.

In some embodiments, the compression scheme is a visually lossless video compression scheme.

In some embodiments, the compression scheme comprises at least one of a JPEG XS, JPEG2000, HT-J2K, JPEG-LS, H.264/MPEG-4 AVC and Dirac compression scheme.

In some embodiments, the at least one high bandwidth video signal and the uncompressed video signal each comprise at least one of an SDI or an IP signal.

In some embodiments, the at least one input card is further configured to transmit the at least one low bandwidth video signal to at least one downstream device.

In some embodiments, the at least one output card is configured to receive the compressed video from an upstream device.

In at least one broad aspect, there is provided a method for down-sampled video routing using a media router. The method comprises: receiving, by at least one input card, at least one high bandwidth video signal; compressing, by a compression module of the at least one input card, the at least one high bandwidth video signal to generate at least one low bandwidth compressed video signal; transmitting the at least one low bandwidth video signal through at least one cross point card; routing, by one or more cross-point cards, the at least one low bandwidth video signal to at least one output card; receiving, by the at least one output card, the at least one low bandwidth video signal; and de-compressing, by a decompression module of the at least one output card, the at least one low bandwidth video signal to generate at least one recovered high bandwidth uncompressed video signal.

In some embodiments, each of the one or more cross-point cards has a card bandwidth limit.

In some embodiments, the high bandwidth video signal has a bandwidth greater than the card bandwidth limit, and the low bandwidth video signal has a bandwidth less than or equal to the card bandwidth limit.

In some embodiments, the card bandwidth limit is approximately in a range of 3 Gbit/s to 3.5 Gbits/s.

In some embodiments, a controller is coupled to each of the at least one input card and the at least one output card, and the method further comprises operating the controller to: control a compression scheme of the at least one compression module in the at least one input card, and control a decompression scheme of the at least decompression module in the at least one output card.

In some embodiments, the compression scheme is a visually lossless video compression scheme.

In some embodiments, the compression scheme comprises at least one of a JPEG XS, JPEG2000, HT-J2K, JPEG-LS, H.264/MPEG-4 AVC and Dirac compression scheme.

In some embodiments, the at least one high bandwidth video signal and the uncompressed video signal each comprise at least one of an SDI or an IP signal.

In some embodiments, the method further comprises transmitting, by the at least one input card, the at least one low bandwidth video signal, to at least one downstream device.

In some embodiments, the method further comprises receiving, by the at least one output card, the compressed video from an upstream device.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

Other aspects and features will become apparent, to those ordinarily skilled in the art, upon review of the following description of some exemplary embodiments.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1A:
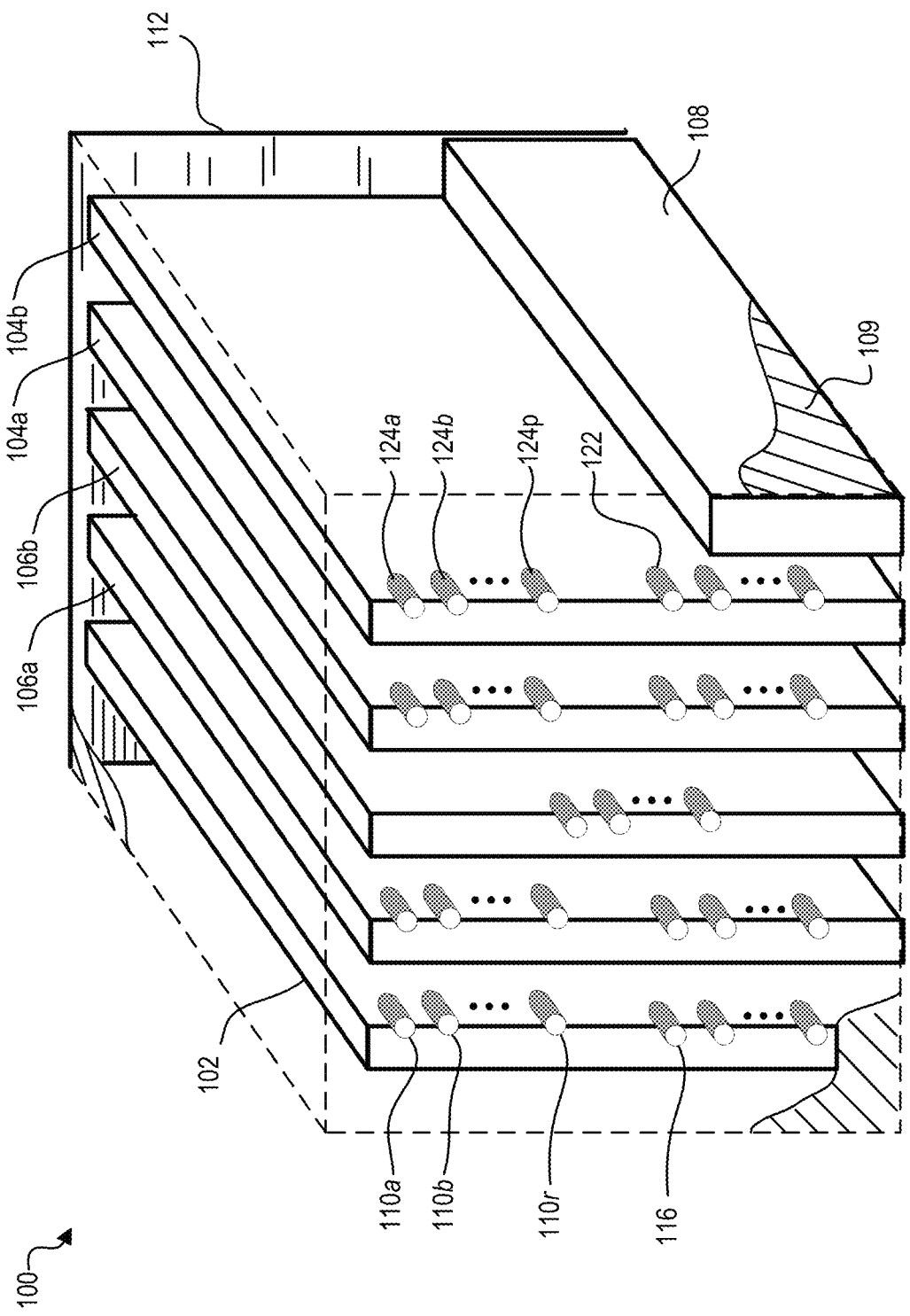
FIG. 1A is a schematic illustration of a cross-section of a media router according to an example embodiment.

The drawings, described below, are provided for purposes of illustration only of, and without limiting, the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION OF THE EMBODIMENTS

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Reference throughout this specification to "one embodiment" or "an embodiment" means that a particular feature, structures, or characteristics may be combined in any suitable manner in one or more embodiments.

It should be noted that the term "coupled" used herein indicates that two elements can be directly coupled to one another or coupled to one another through one or more intermediate elements. Furthermore, the term "body" typically refers to the body of a patient, a subject or an individual who receives the ingestible device. The patient or subject is generally a human or other animal.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Digital video signals are generally transmitted, through transmission networks, using various transmission standards developed by different standards organizations. One example standard organization is the "The Society of Motion Picture and Television Engineers" (SMPTE), which has developed a number of interface standards for transmission of digital video data via cables (e.g., coax cables). Example SMPTE standards include serial digital interface (SDI) transmission which can be used to transmit uncompressed, unencrypted digital video data, and optionally embed audio, metadata and timing data alongside the video content. SDI transmission standards can include, for example, Standard Definition (SD)-SDI standards, which support bandwidths of up to 270 Mb/s, and can be used to transmit SD video streams (also known as the SMPTE standard 259M). Further, the HD-SDI standard can be used for the transmission of digital video signals with a bandwidth of up to 1.485 Gbit/s, which is generally sufficient for the transmission of High Definition (HD) 720p and 1080i video (also known as the SMPTE standard 292M). Other SDI standards include the 3G-SDI standard which can support bit rates up to 2.97 Gbit/s, and 6G-SDI standard for supporting signals of up to 5.940 Gb/s. SMPTE has also introduced the ST-2082 standard (12G Serial Digital Interface or 12G-SDI) standard that provides a bandwidth of 12 Gbit/s, which is sufficient for the transmission of at least 4K Ultra High Definition (UHD) video streams.

SMPTE has also introduced various standards for transmission of digital video over an IP network. For example, these standards include the ST-2022 standard, as well as the ST-2110 standard. In particular, the ST-2110 standard allows for placing each part of a signal (e.g., video, audio (e.g., AES67 audio) and ancillary (ANC) data)) into separate streams, which are separately routable. Using this standard, a recipient device can request one or more of the audio, video or ancillary data, and receive the requested element or elements. Generally, the STMPTE-2110 standard is video format agnostic, and can support SD, HD, UHD as well as other video formats.

As stated in the background, older or legacy media routing devices are not typically capable of routing media signals containing high bandwidth digital video content. This is often owing to the integrated circuitry (IC) used in these routers, which can only tolerate routing of data streams up to certain data transmission rate limits. In many cases, older media routing devices may only be capable of routing digital video content transmitted using SD, HD or 3Gtransmission interfaces, or otherwise, lower bandwidth video streams transmitted over IP (e.g., less than 10 GHz bandwidth). Accordingly, these media routing systems may not be able to handle higher data rate transmission interfaces, including 6G-SDI or 12G-SDI, or 6G and 12G bandwidth video streams transmitted over IP. In view of the foregoing, there is a desire to provide a system and method for simplifying re-adaption of older media routing systems to handle routing of higher bandwidth digital video content.

Figure 1B:
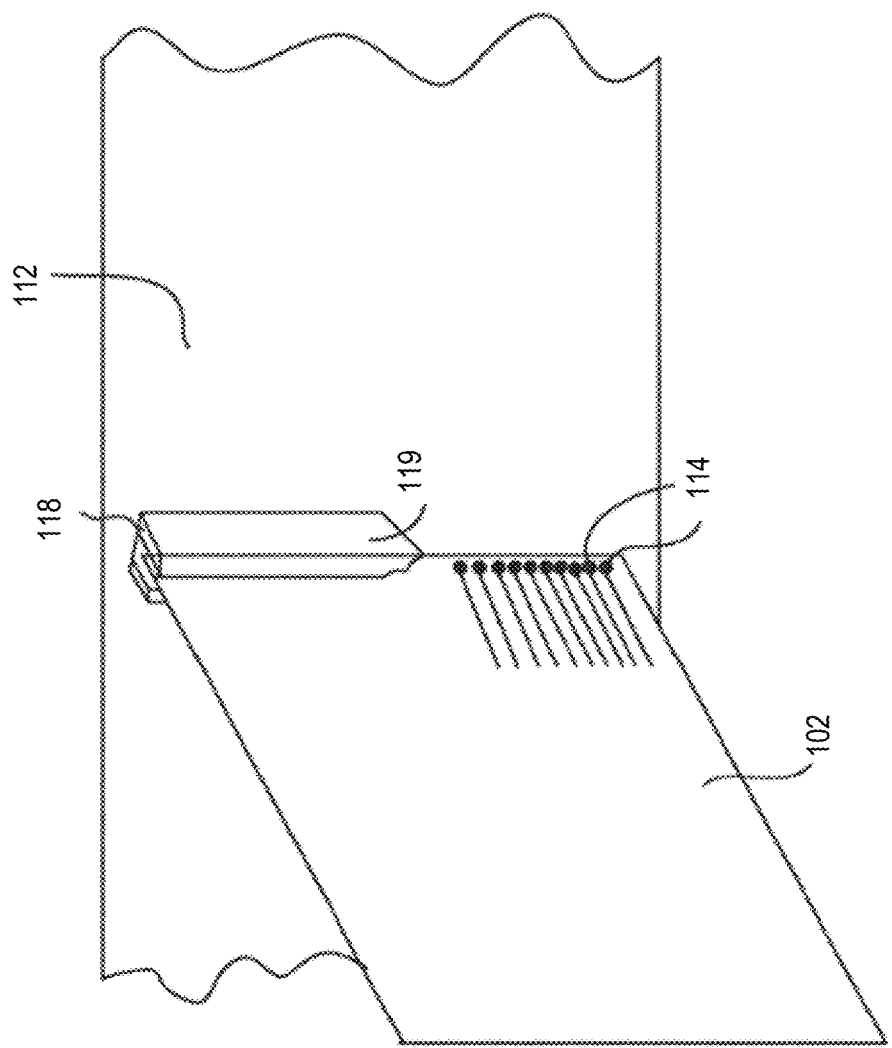
FIG. 1B is a schematic illustration of a portion of a media router according to another example embodiment.
Figure 2:
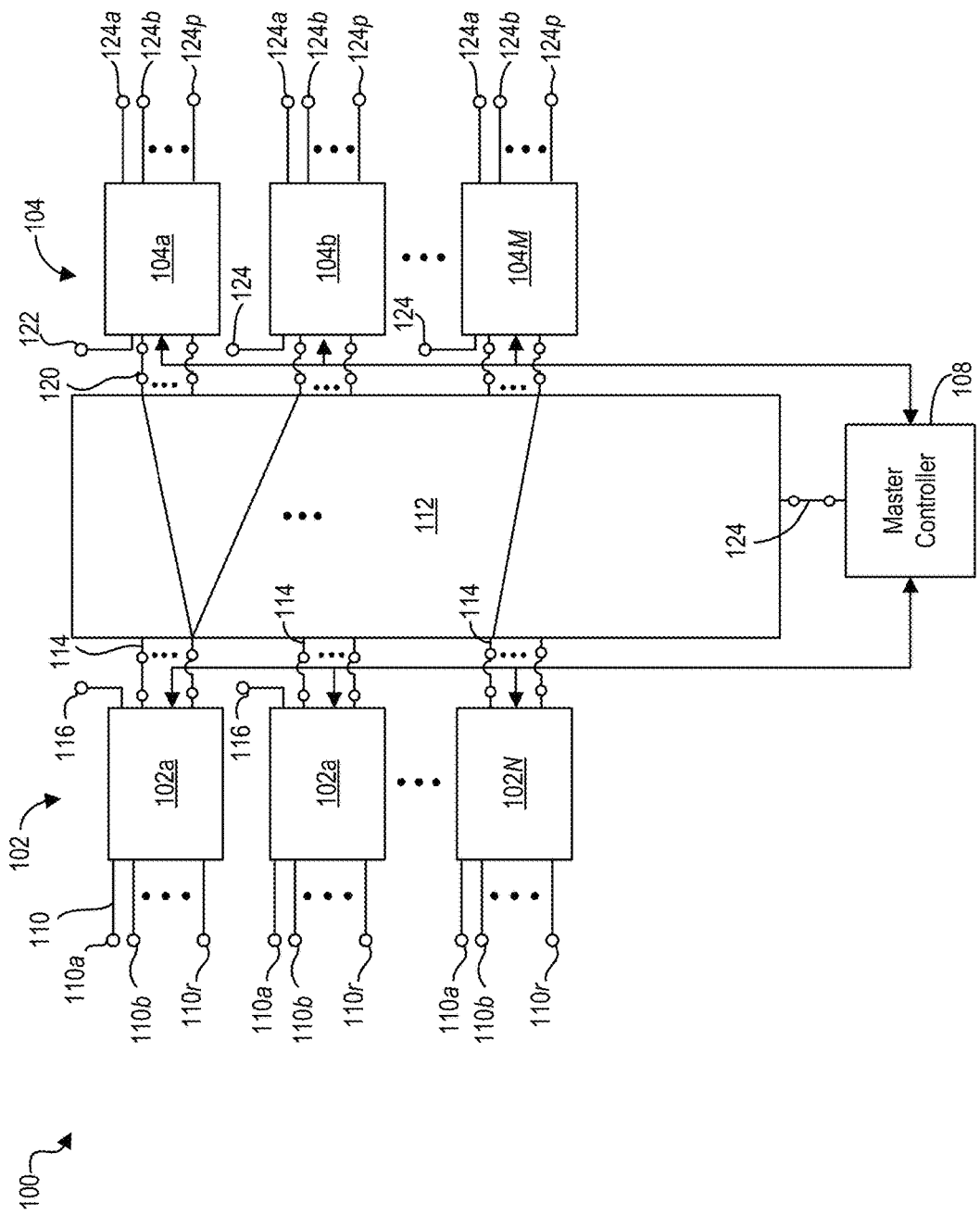
FIG. 2 is a simplified block diagram of a media router according to an example embodiment.

Reference is now made concurrently to FIGS. 1A, 1B and 2, which provide various schematic illustrations for example embodiments of a media router 100.

As shown, the media router 100 can generally include a plurality of cards, including one or more input cards 102a-102N, one or more output cards 104a-104M, and one or more cross-point cards 106. In some embodiments, router 100 can also include a controller 108 to control the operation of at least some of the input, output and cross-point cards.

As best illustrated in FIG. 1A, a frame housing 109 may be provided for mounting the cards 102-106 and controller 108. The cards 102-106 and/or controller 108 may either be removably fixed inside of frame housing 109, or otherwise, permanently attached to the housing 109. In cases where at least some of the cards 102-106 or controller 108 are removably fixed, router 100 can be said to have an at least partially modular structure. Accordingly, this can allow for some cards 102-106 and/or controller 108 to be removed and/or substituted for other cards.

While FIG. 1A illustrates the frame 109 as housing the entirety of router 100, it will be appreciated that, in other embodiments, a subset of the router 100 may be provided externally. For example, rather than positioning controller 108 inside of frame 109, controller 108 can be positioned externally to the frame housing 109. In this configuration, the controller 108 may communicate remotely to control various elements of the router 100, as provided in further detail herein. In other embodiments, multiple controllers can be provided for controlling router 100. For example, some controllers may be provided inside of the frame housing 109, while other controllers provided outside of the frame housing 109. In some cases, a controller may not be provided for controlling router 100, and the router 100 may otherwise be operable to operate autonomously.

As shown in FIGS. 1A and 1B, each of cards 102-106 and controller 108 may electrically couple to a backplane 112 of the frame 109. The backplane 112 provides electrical pass-through connections between cards 102-106 and controller 108, such that data streams (e.g., media streams) can be transmitted between various components in the router 100.

To electrically couple cards 102-106 and controller 108 to backplane 112, backplane 112 can include a plurality of electrical connectors 118 (FIG. 1B), each connector including a plurality of electrical contact pins 119. The contact pins 119 electrically couple to corresponding contact pins provided on each of card 102-106 and controller 108. For example, contact pins 119 of backplane 112 can couple to contact pins 114 on input cards 102 (FIG. 1B). Similarly, as shown in FIG. 2, output cards 104 can include one or more card pins 120 to connect to backplane 112. Further, controller 108 may also include contact pins 124, to couple to the backplane 112 (FIG. 2). As provided in further detail herein with reference to FIG. 3, electrical pins 302, 304 may also be provided on the cross-point cards 106 to couple to backplane 112.

As shown in FIG. 2, media router 100 is generally configured to internally route media streams between one or more input cards 102, and one or output cards 104, using one or more cross-point cards 106, via the backplane 112. The media streams can include one or more video, audio and metadata components. In some cases, the media stream can include a single type of component (e.g., audio, video or metadata), or a combination of multiple types of components. In various cases, the different components of a media stream can be transmitted separately, such that information in one stream is not embedded in another stream. This may be the case, for example, where the media streams are transmitted using an SMPTE 2110 IP transmission standard. In other cases, the audio and/or metadata components can be embedded in a non-visible portion of a video signal, as is the case with an SDI transmission standard.

Figure 3:
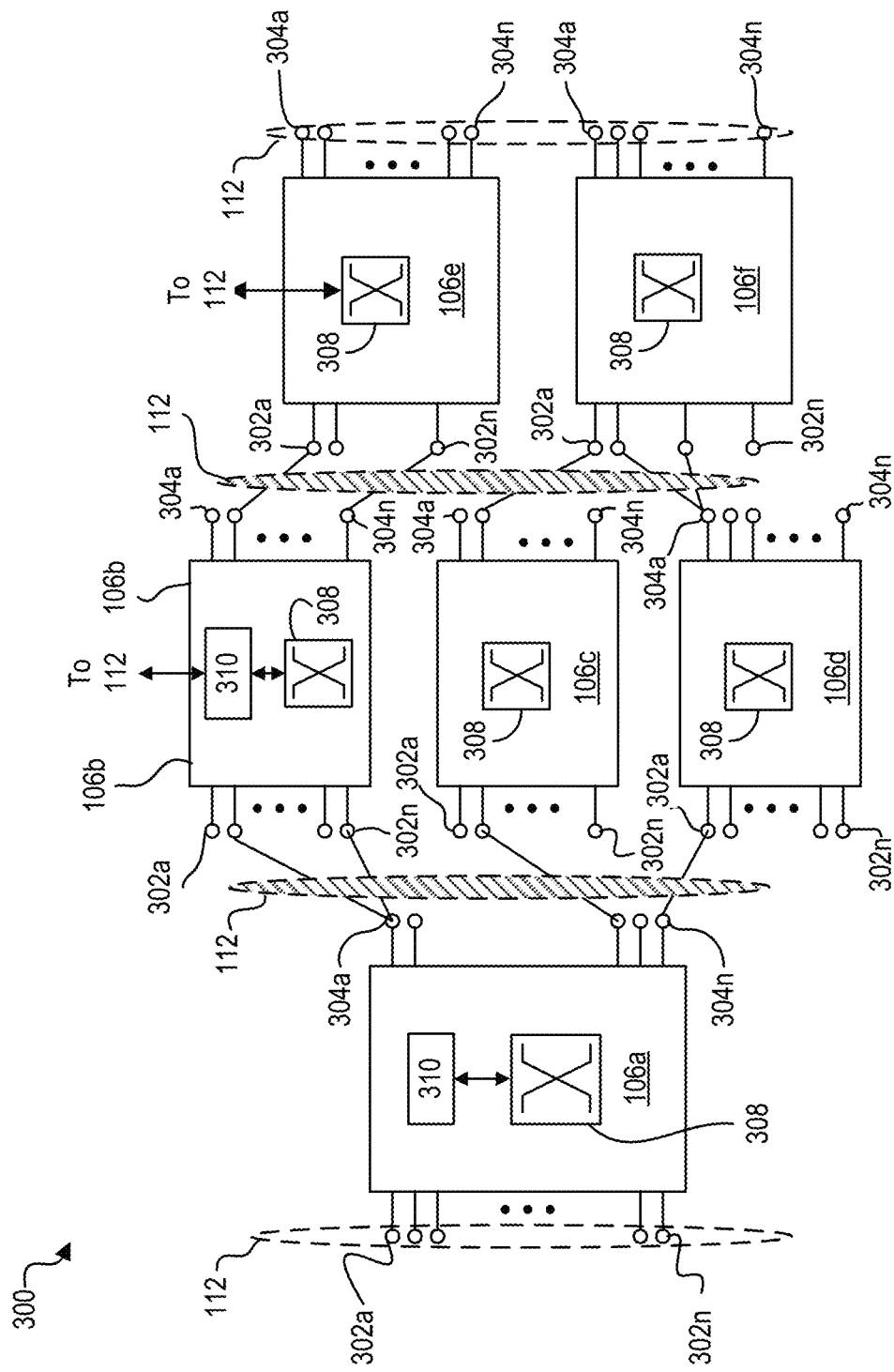
FIG. 3 is a simplified block diagram showing an arrangement of cross-point switch cards inside of a media router, according to some embodiments.

Reference is now made briefly to FIG. 3, which schematically illustrates an example arrangement 300 of cross-point cards 106, which can be used for internally routing media streams between designated input cards 102 and output cards 104 of router 100.

As shown, router 100 can include one or more cross-point cards 106. In the example arrangement 300, the cross-point cards 106 include an input cross-point card 106a, one or more intermediate cross-point cards 106b-106d, and one or more output cross-point cards 106e-106f.

Each cross-point card 106 includes a plurality of input terminals 302a-302n and a plurality of output terminals 304a-304n. Each of the input terminals 302 and output terminals 304 may connect to backplane 112 to receive or transmit media signals from other cards in router 100 (e.g., input cards, output cards or other cross-point cards). In some cases, some of the input or output terminals may also directly or indirectly couple to external media devices, located outside of the router 100.

In order to route signals, each cross-point card 106 can include a cross-point switch 308. Cross-point switch 308 functions to couple one or more designated input terminals 302 of a cross-point card 106, to one or more designated output terminals 304. Accordingly, media streams received at the input terminals 302 can be internally routed, through the switch 308, to one or more output terminal 304.

In some embodiments, switches 308 may be configured to have a fixed switch configuration. In other words, specific input terminals 302 may be permanently coupled to specific output terminals 304. In other embodiments, the switches 308 can have a variable, or adjustable, switching configuration. In these cases, some cross-point cards 106 can include a cross-point card controller 310 to control the configuration of switches 308 (e.g., cross-point cards 106a and 106b). In particular, the card controller 310 can control the switch configuration of switches 308 to selectively couple, or de-couple, designated input terminals 302 to designated output terminals 304. In this manner, the card controller 310 can control internal routing of media streams through the cross-point card 106. In some cases, the card controller 310 can also monitor the current switching configuration for a switch 308 and store an updated record.

Card controllers 310 can either operate autonomously or independently (e.g., cross-point card 106a) and/or may communicate with the master controller 108, via backplane 112 (e.g., cross-point card 106b) as well as other secondary controllers in communication with router 100 (e.g., an external controller).

In cases where the card controller 310 is operating independently, the card controller 310 can automatically vary the switching configuration of a switch 308 having regard to a destination of a media stream. Card controller 310 can determine the destination of a media stream based on, for example, the input terminal 302 that receives the media stream. For example, specific input terminals 302 may receive media streams typically transmitted to specific destination devices. In other cases, the card controller 310 can analyze the media stream to determine a designated destination. For example, the contents of the media stream (e.g., metadata content) can be analyzed to determine a destination (e.g., the destination may be identified in the metadata content).

In other cases, where the card controller 310 is communicating with a secondary controller (e.g., master controller 108 or an external controller), the card controller 310 can receive switch configuration instructions from the secondary controller. For example, the master controller 108 can transmit instructions to a card controller 310 to couple a specific input terminal 302 to a specific output terminal 304. The card controller 310 may then implement the received configuration instructions. Card controller 310 may also transmit information, back to the secondary controller, in respect of the current switch configuration. This switch information may be transmitted on a continuous basis, at specific frequency intervals, or in response to specific events (e.g., a request from the secondary controller).

In some cases, a secondary controller (e.g., master controller 108) can receive switch information from one or more cross-point cards 106 in router 100. This, in turn, can allow the secondary controller to generate a global routing map for all routing paths in the router 100, and across all cross-point cards 106. In some embodiments, based on the global routing map, the secondary controller can control transmission of media streams through cross-point cards 106 to properly route an incoming media stream from an input card 102 to one or more designated output cards 104. The global routing map may also allow the secondary controller to transmit appropriate switch configuration instructions to cross-point cards 106 having regard to the switch configurations of all other cross-point cards 106 in router 100. The secondary controller may additionally transmit the global routing map to each cross-point card controller 310. This, in turn, provides each card controller 310 with a "global view" of all cross-point card configurations across all other cross-point cards 106 of router 100. Accordingly, this allows each card controller 310 to independently make switch configuration changes, having regard to all other cross-point card switch configurations, to properly route an incoming media streams to a desired destination.

In at least some embodiments, rather than providing a card controller 310 in each cross-point card 106, the switch 308 in each cross-point card 106 may directly couple to a secondary controller (e.g., master controller 108 or an external controller) (e.g., cross-point card 106*e*).

In various cases, one or more of the cross-point cards 106 provided inside of the router 100 may have limited ability to route media streams containing high bandwidth video content. In particular, the one or more cross-point cards 106 may be limited to routing media streams having a bandwidth equal to, or less than, a respective card bandwidth limit for the cross-point card 106. For example, a cross-point card 106 of router 100 may have a card bandwidth limit equal to, or less than 3G or 3.5G. Accordingly, these cross-point cards may only tolerate routing of video streams transmitted using an SD-SDI, HD-SDI or 3G-SDI interface, or otherwise, compressed or uncompressed video streams transmitted over IP and having a bandwidth of less than 3G or 3.5G. These same cross-point cards 106 may not otherwise handle routing of media streams having a bandwidth greater than the respective card bandwidth limit, including higher bandwidth video content including, for example, video content transmitted via a 6G-SDI or 12G-SDI interface, or otherwise, compressed or uncompressed video content transmitted over IP and having a 6G, 12G or higher bandwidth. In many cases, the limited bandwidth routing capacity of these cross-point cards 106 may be owing to the integrated circuitry of their respective switches 308, which may only tolerate switching of certain limits of data transmission rates.

In some embodiments, the card bandwidth limit of each cross-point card 106 in router 100 can be stored by the respective cross-point card controller 310. The card bandwidth limit can be provided to a secondary controller (e.g., master controller 108 or an external controller) automatically by the cross-point card controller 310 (e.g., upon installing the cross-point card 106 in the router 100), or otherwise, upon request from the secondary controller.

Referring now back to FIG. 2, to accommodate routing of high bandwidth media streams through cross-point cards 106 with limited bandwidth routing capacity, router 100 may include one or more input cards 102 and one or more output cards 104. That is, router 100 can be configured to accommodate routing of media streams with bandwidths above the card bandwidth limit, of various cross-point cards 106, by including one or more input cards 102 and one or more output cards 104.

In general, input cards 102 are configured to receive media streams containing high bandwidth video content (e.g., media streams having a bandwidth greater than the card bandwidth limit of one or more cross-point cards 106), and compress (e.g., down-sample) the video content to generate one or more low bandwidth compressed video streams (e.g., video streams having a bandwidth less than, or equal to the card bandwidth limit of one or more cross-point cards 106). The compressed video streams may then be routed through one or more cross-point cards 106 having limited routing bandwidth capacity, and to one or more designated output cards 104. At the output card 104 end, the compressed video is de-compressed (e.g., up-sampled) to recover the high bandwidth video content, and subsequently, transmit the recovered content to further downstream devices. In other words, the output card 104 can generate video content having a bandwidth greater than the card bandwidth limit of one or more cross-point cards 106. In this manner, input cards 102 and output cards 104 may be quickly and inexpensively deployed (e.g., installed) in older routers 100 (e.g., routers having cross-point cards 106 having low card bandwidth limits) to adapt the router to handle high bandwidth video content (e.g., video content with a bandwidth greater than the card bandwidth limit of cross-point cards 106). Accordingly, older media routers 100 can be easily re-configured to handle the increasing demand for high bandwidth digital video content.

As best shown in FIG. 2, each input card 102 can include one or more input terminals 110*a*-110*r*. Input terminals 110 couple, directly or indirectly, to upstream media devices coupled to the router 100. For example, in a broadcast production facility for live programming content (e.g., live television programs, or live sports games), input terminals 110 can couple to video source feeds (e.g., cameras) or audio source feeds (e.g., microphones). Input terminals 110 can also couple to intermediate media processing devices, which process streams generated by various source devices (e.g., synchronization or equalization modules). Rather than couple to a media device, input terminals 110 can also couple to a data storage which stores archived media content. In these cases, media streams can be retrieved from the data storage for routing to other downstream devices.

In various cases, each input terminal 110, of input card 102, can couple to a single upstream media device, or otherwise, to multiple upstream devices. Multiple devices may couple to a single input terminal, for example, where the devices transmit media streams to the input terminal during non-overlapping time intervals. In some cases, multiple input terminals, of the same input card 102, or across different input cards 102, can also couple to a single upstream device. For example, a single upstream device can transmit separate associated video, audio and metadata streams (e.g., using an SMPTE 2110 IP transmission) to different input terminals of the same input card 102, or different terminals of different cards 102.

Each input card 102 also includes one or more output signal terminals 114. Output terminals 114 feed into backplane 112, and are used to transmit processed (e.g., compressed), or unprocessed, media streams to one or more cross-point cards 106 for internal routing.

In some embodiments, input cards 102 can also include secondary output terminals 116, which do not feed into the backplane 112. Terminals 116 can connect, directly or indirectly, to one or more downstream media devices, or otherwise, back to a media device transmitting media streams to the input card 102. In some cases, output terminals 116 can be used where a media device transmits, to input card 102, signals comprising uncompressed high bandwidth video content (e.g., uncompressed SDI or IP video content) via input terminals 110. The input card 102 can process at least the high bandwidth video content to generate low bandwidth compressed video. The compressed video may then be transmitted, via the secondary output terminals 116, back to the transmitting media device or to another media device (e.g., using compressed IP transmission). In this manner, input cards 102 can act as "on-demand" video compressors, separate from the card's functionality with respect to router 100. In some cases, copies of compressed video can be transmitted to both the output terminals 114 and the secondary output terminals 116.

Figure 4:
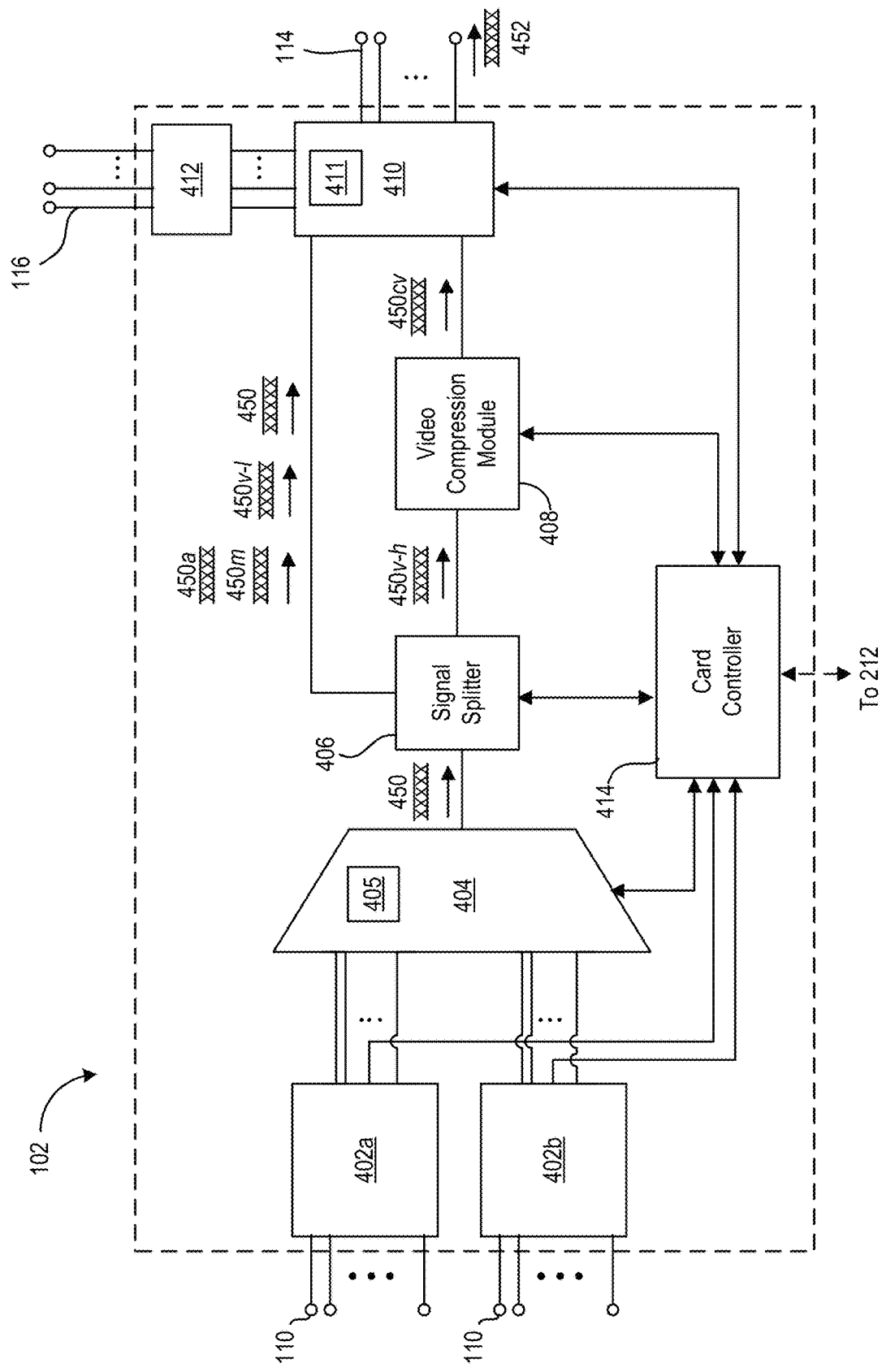
FIG. 4 is a simplified block diagram of an example input card for use in a media router, according to some embodiments.

Referring now to FIG. 4, which shows a simplified block diagram for an example input card 102, according to some embodiments.

In the illustrated example, input card 102 can include at least one or more input modules 402, and a video compression module 408. In some cases, the input card 102 may also include a signal feed forward 404, a signal splitter 406, a multiplexer and router (M&R) 410 and an output module 412. A card controller 414 can also be provided and coupled to one or more components of the input card 102. In some cases, card controller 414 may further couple to the master controller 108, via backplane 112, or to an external controller. In other cases, controller 414 may not couple to any secondary controllers, and may operate entirely autonomously.

Input modules 402 are configured to receive media streams, via one or more input terminals 110. The media streams may be received from upstream devices which are coupled to the input card 102. In other cases, the media streams can be retrieved from a data storage medium in communication with router 100.

The media streams received at input modules 402 may include one or more video, audio and/or metadata components. The video components may comprise, for example, SD, HD, or UHD (4K, 8K, 16K, etc.) video, transmitted in compressed or uncompressed format. In some cases, the media streams can be transmitted using an SDI transmission interface (e.g., 3G-SDI, 6G-SDI, 12G-SDI, or 48G-SDI), which includes uncompressed video content, and/or one or more embedded audio and/or metadata components. In other cases, the media streams may be transmitted using an IP transmission interface. For example, an STMPE 2110 IP transmission may be used, whereby separate video, audio (e.g., AES67 audio) and/or metadata (e.g., VANC metadata) streams are transmitted. The IP streams can carry compressed or uncompressed video content.

To facilitate reception of media streams, input card 102 can include multiple input modules 402 for receiving streams transmitted using different transmission interfaces. For example, in the illustrated embodiment, input card 102 can include an input module 402a to receive SDI signals, and an input module 402b to receive IP signals. In some cases, some of the input models may also include wireless receivers for receiving wirelessly transmitted signals (e.g., wireless IP signals).

Input module 402a can receive various types of SDI signals, including SD-SDI, HD-SDI, 3G-SDI, 6G-SDI, 12G-SDI and 48G-SDI signals. The input module 402a can include a suitable gear box to connect to an appropriate SDI link. In some cases, the input module 402a can include one more female Bayonet Neill-Concelman (BNC) connectors, which mate with reciprocal male BNC connectors on SDI cables. In some embodiments, a single SDI signal can be received at the input module 402a using a single link (e.g., a single 12G-SDI link), or using multiple links (e.g., a quad link 3G-SDI for transmitting a 12G SDI signal).

Similarly, input module 402b can include one or more optical ports, including 25 GbE or 100 GbE Quad Small Form Factor Pluggable (QSFP) ports, which couple to fiber optic cables carrying IP streams (e.g., STMPE 2110 IP streams) (e.g., four 25 GbE QSFP ports, or one 100 GbE QSFP port). The IP streams can include compressed or uncompressed video content transmitted as a single stream (e.g., a 2110-20 UHD signal with a 12G bandwidth), or as multiple associated streams (e.g., Quad 2110-20 3G over IP corresponding to a 12G video stream). The input module 402b can also receive separate audio and metadata streams transmitted using an SMPTE 2110 IP transmission standard.

Each input module 402 may couple to card controller 414. This may allow, for example, card controller 414 to tap incoming streams received at the input modules 402. As provided in further detail herein, the controller 414 can analyze the content of tapped incoming media streams, and based on the analyzing, vary the operation of one or more components of the input card 102.

While two input modules have been illustrated, it will be appreciated that any number of input modules 402 can be provided inside the input card 102 to accommodate any number of transmission interface standards. In some cases, a single input module can also include suitable hardware architecture to accommodate multiple types of transmission interfaces.

Input card 102 may also include a signal feed forward 404. Signal feed forward 404 can choose the type, or quantity, of media streams passed through the input card 102 at a given time.

In some cases, feed forward 404 can be used to choose between passing only SDI or IP media streams received from input modules 402. In some embodiments, this can be done to include only SDI or IP receivers so that only SDI or IP streams can be passed through the input card 102.

Feed forward 404 can also limit the quantity of media streams being passed through the input card 102. Limiting the number of streams passed into the input card 102 can, in some cases, avoid overwhelming the processing capabilities of the input card 102. For instance, feed forward 404 may limit only a single media stream from being passed through input card 102 at a given time. Feed forward 404 can also limit passing through of multiple media streams if, for example, the media streams are associated (e.g., associated video, audio and metadata IP streams, or video streams transmitted through a multi-link connection). In still other cases, the feed-forward 404 can pass through limited batches of unrelated media streams.

In some embodiments, feed forward 404 can include a memory buffer 405. Memory buffer 405 can temporarily store incoming streams which are not immediately passed through by feed forward 404. Memory buffer 405 can also store streams received at the feed forward 404 with different time bases, and which require synchronization to a common time base (e.g., via genlock or IEEE-1588 precision time protocol (PTP)). For instance, separately transmitted and associated video, audio and metadata IP streams can be received with different times bases at feed forward 404. Accordingly, the streams can be temporarily stored in memory buffer 405 until all streams are synchronized. Once all streams are synchronized, the memory buffer 405 can release the streams.

To control the operation of feed forward 404, the feed forward 404 may couple to the card controller 414. Card controller 414 can, in turn, control and adjust the operating conditions of the feed forward 404.

In some embodiments, card controller 414 can control feed forward 404 to limit the type of media streams being passed through by the feed forward module 404. For instance, controller 414 can control (e.g., transmit control instructions) to feed forward 404 to only pass media streams either from the SDI input module 402a, or the IP input module 402b. The determination as to whether to pass media streams from input modules 402a or 402b can be made, for example, by monitoring (e.g., tapping) incoming signals at the input modules 402 (or directly at the feed forward 404). In particular, controller 414 can monitor incoming signals to determine that an input module has recently received a new incoming stream. In response, controller 414 can instruct feed forward 404 to pass media streams from the relevant module. In other cases, card controller 414 can also control feed forward 404 to pass a pre-determined number of signals from each of the input modules 402a and 402b. For example, controller 414 may be configured to pass any pre-determined number of signals comprising any combination of inputs 110 from each of the first and second input cards 402a, 402b.

Controller 414 can also control feed forward 404 to limit the number (e.g., quantity) of media streams being passed-through into input card 102. For example, controller 414 can detect that IP input module 402b has received a number of associated media streams (e.g., video, audio and/or metadata). Accordingly, controller 414 can instruct the feed forward 404 to simultaneously pass through the associated media streams. Controller 414 can determine that media streams are associated, for example, by tapping the incoming media streams—either at the input modules 402 or directly at the feed forward 404—and analyzing the content of the media streams (e.g., associated metadata, etc.) to determine an associated relationship. In other cases, an associated relationship can be determined based on the input terminal receiving the streams (e.g., streams received at the same input terminal may be associated), or the time the media streams are received (e.g., streams received at the same time may be associated), or the source device transmitting the media streams. In some cases, the source device is determined based on the input terminal receiving the media stream (e.g., specific input terminals may be coupled to known source devices), or analyzing the content of the media stream (e.g., metadata content may indicate a common source or destination device).

In some cases, associated media streams can be received at different input terminals of different input cards. In these cases, it may be necessary for controller 414 to co-ordinate with card controllers 414, of other input cards 102—directly or via a secondary controller (e.g., master controller 108 or an external controller)—to ensure the feed forward 404 in each card is synchronized with respect to forwarding the correct associated media streams.

In some cases, controller 414 can also ensure that media streams transmitted using a multi-link connection are passed-through together by feed forward 404.

Controller 414 can also control the number (e.g., quantity) of media streams, passed by feed forward 404, having regard to other considerations, including the processing capacity of the input card 102, the processing capacity of one or more output cards 104 designated to receive the media stream, and/or the routing capacity of cross-point cards 106 designated to route the media streams. The processing capacity of the input card 102 can be determined, for example, by monitoring the traffic through one or more components of the input card 102. The capacity of designated output cards 104 or cross-point cards 106 can be determined, for example, by communicating—directly, or indirectly via master controller 108 or an external controller—with the respective output card controllers, or cross-point card controller 310. These controllers can provide the controller 414 with processing capacity and traffic information, either automatically or upon request. As provided in further detail herein, in some cases, card controller 414 can identify the output cards 104 or cross-point cards 106 designated to receive or route the media streams based on a determined routing path for a media stream.

Controller 414 can also determine which media streams feed forward 404 passes through having regard to the priority of a media stream, the source device transmitting the media stream or the destination device receiving the media stream. For example, media streams having a higher priority (e.g., live or on-demand streams), or media streams transmitted from prioritized source devices or prioritized destination devices, can be prioritized for transmission by controller 414.

Signal splitter 406 receives media streams passed by the feed forward 404, and operates to separate high bandwidth video content, from other stream components, including audio, metadata and/or low bandwidth video stream components.

By way of illustrative example, FIG. 4 shows an example media stream 450 transmitted from the feed forward 404 to the signal splitter 406. Media stream 450 can represent an SDI stream carrying high bandwidth video content and embedded audio and/or metadata components. Media stream 450 can also represent multiple associated IP streams, including at least one high bandwidth video stream, as well as audio and/or metadata streams. As used herein, high bandwidth content (e.g., media or video content) can refer either to content having a bandwidth greater than a card bandwidth limit for one or more cross-point cards 106 in router 100, or otherwise, content having a bandwidth simply greater than a desired bandwidth. As shown, signal splitter 406 receives the media stream 450, and operates to split (e.g., separate) the high bandwidth video component $450v\text{-}h$, from one or more of the audio component $450a$, metadata component $450m$ and/or low bandwidth video component $450v\text{-}l$. The high bandwidth video signal $450v\text{-}h$ is then transmitted, by signal splitter 406, to video compression module 408. The remaining signal components can be transmitted around the compression module 408, and directly to multiplexer and router module 410. In some embodiments, the signal splitter 406 may also generate a lower low quality bandwidth component $450v\text{-}l$ from the high bandwidth video component $450v\text{-}h$. For example, this can occur by sub-sampling the high bandwidth video component $450v\text{-}h$ or downscaling high bandwidth video component $450v\text{-}h$ through filtering. In this case, the generated lower, low-quality bandwidth video component $450v\text{-}l$ can also be transmitted around the compression module 408.

In some cases, a media stream 450 may not include high bandwidth video content, and may only include audio, metadata or low bandwidth video content. As used herein, low bandwidth content (e.g., media or video content) may refer either to content having a bandwidth equal to or less than a card bandwidth limit of one or more cross-point cards 106, or otherwise, content having a sufficiently low desirable bandwidth. In these cases, the signal splitter 406 may not split the signal, but can simply pass the signal around the compression module 408. In other cases, signal splitter 406 can still split the signal, but can transmit each split signal component around compression module 408. In still other cases, in cases where media stream 450 only includes high bandwidth video content, the signal splitter 406 can directly transmit the media stream 450 to compression module 408 without any splitting operation.

In cases where the signal splitter 406 operates to split an incoming media signal 450, the splitting operation may depend on the type of media signal received. For example, where the media stream is an SDI signal, signal splitter 406 can operate to de-embed the embedded audio 450a and/or metadata component 450m, from the high bandwidth video component 450v-h. In other cases, the media stream may comprise a plurality of separate video, audio and/or metadata IP streams. In these cases, the signal splitter 406 may be simply "split" the signal by re-routing the high bandwidth video stream 450v-h to compression module 408, while re-routing the remaining streams to the multiplexer and router 410.

In at least some embodiments, the signal splitter 406 can be controlled by card controller 414. For example, card controller 414 can instruct the signal splitter 406 whether or not to split an incoming signal based on whether the signal includes a high bandwidth video component 450v-h. In some cases, card controller 414 can tap an incoming media signal from input modules 402, feed forward 404 or directly from the signal splitter 406. The controller 414 can then analyze the tapped media signal to determine whether it includes one or more high bandwidth video components (e.g., by analyzing associated metadata which may indicate the nature of the video component, or otherwise, by directly analyzing the video contents of the media stream). The card controller 414 can also determine whether a media stream includes high bandwidth video based on the input terminal receiving the media stream (e.g., specific input terminals may be connected to specific media devices which consistently transmit high bandwidth video content), or otherwise, determining the source device transmitting the stream, and/or destination device designated to receive the stream (e.g., specific source or destination devices may be known to transmit/receive high bandwidth video content). The source and destination devices can be determined based on analyzing associated metadata, analyzing the video content (e.g., specific video content can be known to be associated with specific source devices, or destination devices), or the receiving input terminal. Based on the analysis, the card controller 414 can determine whether or not the signal splitter 406 should split the signal.

Card controller 414 can also control the operation of signal splitter 406 based on whether an incoming signal is an SDI or an IP signal. For example, SDI signals may require de-embedding non-video components to separate the high bandwidth video signal, from the audio and/or metadata components. In the case of IP streams, the video, audio and/or metadata streams may simply require re-routing. In various cases, card controller 414 can determine whether a signal is an SDI or IP signal by analyzing the signal content, or otherwise, by determining which input module received the signal.

While the illustrated embodiment shows all signals from the feed forward 404 being directly transmitted to the signal splitter 406, in other cases, signals which do not require splitting may be immediately directed around the signal splitter 406. For example, a separate transmission path can be provided from the feed forward 404 or input modules 402 around the signal splitter 406, and the controller 414 can control the routing of signals through that transmission path. It will also be appreciated that, in some embodiments, the input card 102 may be designated to receive only media streams containing high bandwidth video streams. For example, the input card 102 may be coupled to media devices which only transmit high bandwidth video signals. In these cases, the input card 102 may or may not require a signal splitter 406.

Input card 102 also includes a video compression module 408 which converts high bandwidth video streams 450v-h into one or more low bandwidth, or low bitrate compressed video streams 450cv. The low bandwidth video streams 450cv, generated by the compression module 408, can be routed through one or more cross-point cards 106 having limited bandwidth routing capacity.

To compress the incoming high bandwidth video streams 450v, the compression module 408 can employ any one of a number of video compression schemes. For example, and by way of non-limiting examples, the compression module can implement any JPEG (Joint Photographic Experts Group) compression scheme, including JPEG XS (ISO/IEC 21222), JPEG2000 (JDK), HT-J2K or JPEG-LS. Other compression schemes can also include MPEG (e.g., H.264/MPEG-4 AVC, HVEC Intra), AV1 Intra and Dirac (Dirac Pro or VC-2) schemes. In various cases, a compression scheme can be selected having regard to a desired compression ratio of the compressed output video, as well as the desired compression quality (e.g., lossy or visually lossless) and/or compression latency.

In some embodiments, video compression module 408 may be configured to implement only a single type of compression scheme. In other cases, card controller 414 may control, or manipulate the compression scheme implemented by the compression module 408.

In cases where controller 414 controls the compression scheme implemented by the compression module 408, controller 414 can adjust the compression scheme having regard, for example, to the bandwidth of the received video signal 450v-h, as well as the card bandwidth limit of one or more cross-point cards 106 located inside router 100. For example, in a case where the received video signal 450v-h has a bandwidth of 12G, and the installed cross-point cards 106 have a card bandwidth limit of 3G, controller 414 can select a compression scheme with a 4:1 compression ratio. In another example case, the received video signal 450v-h can have a bandwidth of 12G, and cross-point cards 106 can have a card bandwidth limit of 6G. In these cases, controller 414 can select a compression scheme having a 2:1 compression ratio.

For the purpose of selecting an appropriate compression scheme, the bandwidth of the received video signal 450v-h can be determined by controller 414 by analyzing, for example, the content of the video signal, or otherwise, analyzing associated metadata (e.g., bandwidth information can be included in associated metadata). The bandwidth may also be determined based on the source device transmitting the video signal. For example, specific source devices may typically transmit video signals having a pre-defined bandwidth. The source device can be determined by controller 414 based on, for example, the input terminal receiving the video stream, or otherwise, analyzing the video content and/or associated metadata (e.g., specific video content can be associated with specific source devices, or source device information can be reflected in associated metadata).

In some cases, the card bandwidth limit of cross-point cards 106 may be known before hand to the controller 414. For example, router 100 may only employ cross-point cards 106 having pre-defined and known card bandwidth limit. In other cases, controller 414 can determine cross-point card 106 card bandwidth limit by communicating—either directly, or indirectly via master controller 108 (or an external controller)—with cross-point card controllers 310. For example, the controller 414 may transmit a request to various cross-point card controller 310 for the respective card bandwidth limit, or otherwise, the information can be provided automatically to input card 102 (e.g., upon installing the input card 102).

In some embodiments, router 100 may include a number of cross-point cards 106, each having different card bandwidth limits. For example, router 100 can include some cross-point cards 106 having a card bandwidth limit equal to or less than 12G, and other cards having a card bandwidth limit of equal to, or less than 3G or 6G. In these cases, controller 414 can select a compression scheme based on which specific cross-point cards 106 are included in the video's routing path. In some cases, controller 414 can determine the cross-point card 106, along the routing path, having the lowest card bandwidth limit, and can select the appropriate compression scheme having regard to a lowest common denominator constraint.

In cases where controller 414 is required to determine which cross-point cards 106 are included along the video stream's routing path, controller 414 can first determine, for example, the destination of the video stream. For example, video streams being routed to specific destination devices may be typically routed through specific pre-designated cross-point cards 106 known to the controller 414. The destination of a video stream can be determined, for example, either by analyzing associated metadata (e.g., the metadata can include destination information), or the input terminal receiving the video stream (e.g., video streams received from specific input terminals or source devices may be known to have pre-determined destinations). In other cases, routing path information can be provided to the controller 414 from the master controller 108 (or an external controller). For instance, the master controller 108 can receive a copy (or other relevant information) pertaining to the video signal, and can determine both a suitable routing path for the video stream to arrive at its destination, as well as cross-point cards 106 located along that routing path. The master controller 108 may then provide this information back to the card controller 414. In some cases, master controller 108 may also provide to card controller 414 card bandwidth limit information for each card 106 located along the routing path. For example, the master controller 108 may store card bandwidth limit information for each cross-point card 106 in router 100, or otherwise, can query the relevant cross-point cards 106 located along the routing path for card bandwidth limit information.

In some embodiments, master controller 108 can adjust the configuration of cross-point switches in cross-point cards 106 to vary the routing path of a video signal. In particular, this may be necessary where an input card's available compression schemes are unable to sufficiently compress a video signal to handle the card bandwidth limit constraint of cross-point cards 106 currently located along the video stream's routing path. In other cases, card controller 414 may communicate with relevant cross-point card controller 310 to request a change of switch configuration where the video signal cannot be sufficiently compressed for routing through specific cross-point cards.

Card controller 414 may also select the compression scheme having regard to the de-compression scheme being employed at an output card 104 designated to receive the video stream. For example, the video stream may be designated for routing to a particular output card 104. As provided in further detail herein, some output cards 104 may only be configured to de-compress specific formats of compressed video. Accordingly, the compression algorithm can be selected to complement a de-compression algorithm at the relevant output card 104. In various cases, the de-compression scheme used at the output card 104 can be determined by card controller 414 through communicating-directly, or indirectly via master controller 108 (or an external controller)—with a card controller of the relevant output card 104. The controller 414 can determine the relevant output card 104 based, for example, on the determined destination of the video streams (e.g., specific destination devices may be coupled to specific output cards 104 known to controller 414 or master controller 108), or the routing path for a video stream (e.g., specific routing paths may lead to specific output cards 104).

In still other embodiments, card controller 414 can select the compression scheme having regard to the requirements of the source device transmitting the video stream and/or the destination device receiving the stream. For example, specific source or destination devices may stipulate requirements as to the compression quality or latency of the transmitted or received video stream. For instance, a source or destination device may require using lossy or visually lossless compression. In some embodiments, the controller 414 can determine the source or destination device transmitting the video stream (as provided earlier), and based on this determination, can determine pre-defined compression requirements associated with the source and/or destination device. In other cases, the compression requirements for the source or destination devices may be included in metadata associated with the video signal.

Multiplexer and router (M&R) 410 receives the low bandwidth video streams 450cv generated by compression module 408, as well as other component streams transmitted around the compression module 408 (e.g., audio streams 450a, metadata streams 450m, low bandwidth video stream 450v-l, and/or combined media streams 450).

In general, M&R 410 operates to route incoming streams to one or more of the cross-point cards 106 in router 100 (via backplane 112) for internal routing, or to an output module 412. Output module 412 may connect, directly or indirectly, to one or more downstream media devices.

In some cases, M&R 410 can also multiplex (e.g., combine) multiple associated signals, prior to routing. For example, M&R 410 can multiplex a low bandwidth compressed video stream 450cv, with one or more associated audio and metadata streams 450a, 450m, to generate a multiplexed stream 452. In this manner, the compressed video, audio and metadata streams can be routed concurrently. It will be appreciated that any suitable multiplexing scheme can be used to combine the signals. For example, the multiplexing scheme can involve multiplexing one or more of compressed video 450cv, audio 450a and metadata 450m streams into a low bandwidth SDI signal. For instance, an SMPTE 299 standard can be used to embed the audio stream 450a, an STMPTE 291 standard can be used to embed the metadata stream 450m and an SMPTE 348M standard can be used for embedding the compressed video stream 450cv.

In cases where signals are multiplexed, the M&R 410 can include a memory buffer 411. Memory buffer 411 can temporarily store incoming media streams until all streams requiring multiplexing are received and synchronized to a common time base. For example, this can be used where audio and metadata streams are received at the M&R 410 prior to receiving the compressed video stream 450cv. In particular, the compression module 408 can introduce a processing delay which causes transmission of the compressed stream 450cv to lag behind the associated audio and metadata streams. In various cases, memory buffer 411 can synchronize the streams to a common time base uses gunlock or PTP synchronization methods.

In other cases, the M&R 410 may not multiplex all associated streams, but may simply transmit at least some of the streams separately through the backplane 112 and/or output module 412. For example, this may be the case where some of the video, audio or metadata streams are routed separately through different cross-point cards 106.

In cases where M&R 410 transmits streams to one or more cross-point cards 106 of router 100, the streams can be transmitted via output terminals 114 coupled to backplane 112. Different output terminals 114 may couple, via backplane 112, to different cross-point cards 106 which can route the media streams to different output cards 104 and/or destination devices. Accordingly, a media stream can be transmitted by the M&R 410 through the appropriate output terminal 114 have regards to its desired destination.

M&R 410 can also transmit streams to the output module 412. Output module 412 can transmit compressed video streams, generated by input card 102, to media devices coupled—directly or indirectly—to the output terminals 116. For example, input card 102 may compress the video stream, and transmit the compressed stream 450cv via output module 412 back to the transmitting device, or otherwise, to another downstream device. Accordingly, this can allow the input card 102 to act as an "on-demand" video compression device, separate from its functions with respect to router 100. In at least some embodiments, media streams containing compressed video, transmitted to output module 412, can be transmitted to downstream devices using an IP transmission interface (SMPTE 2110 IP). The output module 412 can accordingly be configured for IP signal transmission, and may include one or more optical ports to connect to optical fibers which carry IP signals. It will be appreciated that an output module 412 need not necessarily be included in input card 102.

In various embodiments, the M&R 410 may be controlled by card controller 414. For example, controller 414 can control whether the M&R 410 transmits media streams to backplane 112, and/or to the output module 412. Controller 414 can also control which output terminal 114 receives and transmits the media streams to backplane 112. These determination can be made, for example, based on the designated destination of the media stream as determined, for instance, by analyzing the media stream content (e.g., specific content can be associated with specific destinations), associated metadata (e.g., metadata can include destination information) and/or the source device transmitting the media stream (e.g., some source devices may be known to transmit streams to designated destinations).

Controller 414 can also control whether M&R 410 should multiplex associated signals, or whether to transmit the signals separately. In some cases, signals can be transmitted separately where the signals are being routed to different destinations (e.g., output cards 104), or through different routing paths.

It will be appreciated that while the input card controller 414 has been described herein as providing certain functions, in other embodiments, the functions described herein with respect to the card controller 414 can also be distributed between other controllers, including the master controller 108 and/or external controllers. In other words, some of the functions described herein with respect to the card controller 414 may be performed by a master controller 108 (or an external controller) in communication with card controller 414. Further, a card controller 414 may not be necessarily provided inside of the input card 102 in all embodiments. For example, in some cases, each component of the input card 102 may be pre-configured to operate autonomously, without intervention of a card controller 414. In other cases, the components of the input card 102 may couple directly to the master controller 108, or to an external controller, which can directly control the functions of the various input card components without the need for card controller 414. It will be appreciated that an advantage of including a card controller 414 inside input card 102 is to provide for a more decentralized routing system wherein each input card 102 is able to operate flexibly to respond to different input signals and return desired output signals.

It will also be appreciated that while the input card 102 has been illustrated with only a single signal splitter 406, video compression module 408, etc., in other embodiments, the input card 102 may include a plurality of each type of component. For example, input card 102 can include a plurality of signal splitter 406, video compression module 408, M&R modules 410, etc. This can allow, for example, the input card 102 to simultaneously process a greater number of incoming media streams.

Referring now back to FIG. 2, router 100 also includes one or more output cards 104. In general, output cards 104 operate to receive compressed video streams, and de-compress the compressed video streams to recover one or more high bandwidth, uncompressed video signals. For example, the output cards 104 can receive video streams have a bandwidth which is equal to, or less than the card bandwidth limit of one or more cross-point cards 106, and can decompress the video signals to generate video signals having a bandwidth which is greater than the card bandwidth limits of one or more cross-point cards 106.

As shown, each output card 104 can include one or more input terminals 120, coupled to backplane 112, for receiving media streams from cross-point cards 106. Output cards 104 may also include one or more output terminals 124a-120p, which transmit processed media streams (e.g., media streams containing de-compressed video content) to one or more downstream media devices. The downstream devices can comprise, for example, destination devices for media streams (e.g., display screen, multi-viewers, etc.), or otherwise, intermediate media processing devices. In some cases, each output terminal 124 may couple to a separate downstream device. In other cases, multiple output terminals 124 of the same, or different output cards 104, may couple to the same downstream device. This can allow, for example, separate video, audio and/or metadata streams to be transmitted to the same downstream device via separate output terminals 124.

In the illustrated example embodiment, some output cards 104 may also include one or more secondary input terminals 122. In particular, secondary terminals 122 may couple to directly to upstream devices to receive media streams. In some example cases, the media streams received at secondary terminals 122 can contain compressed video content. The compressed video content can be de-compressed by the output card 104 and transmitted, via output terminals 124, back to the transmitting device, or otherwise, to other downstream devices. In this manner, output cards 104 can operate as "on-demand" video de-compressing devices, separate from the output cards functionality with respect to router 100.

Figure 5:
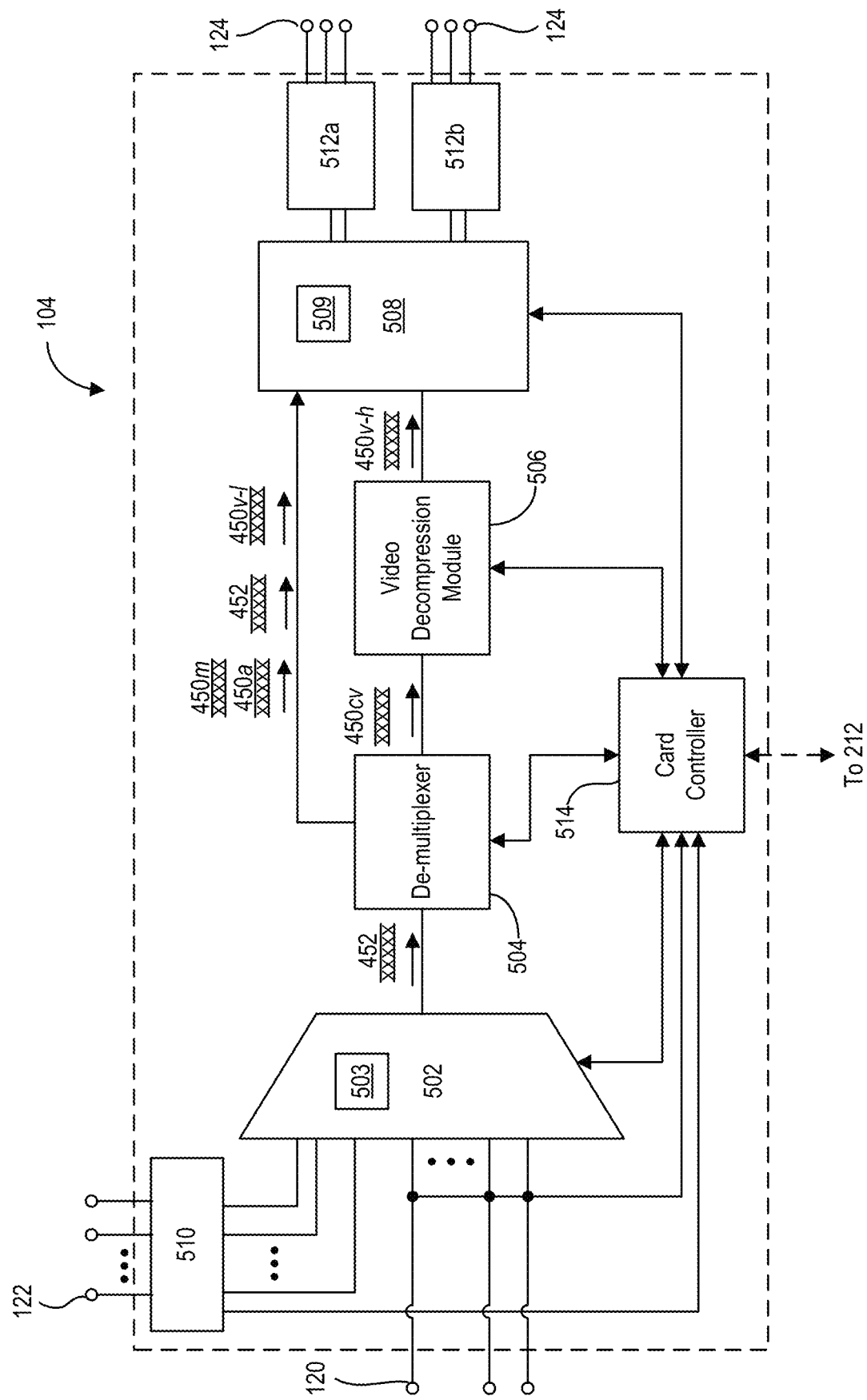
FIG. 5 is a simplified block diagram of an example output card for use in a media router, according to some embodiments.

Referring now to FIG. 5, which shows a simplified block diagram for an example embodiment of an output card, in accordance with some embodiments.

As shown, output card 104 generally includes at least a video de-compression module 506 and one or more output modules 512. In some cases, the output card 104 may also include an input module 510, a signal feed forward 502, a de-multiplexer 504, and a signal combiner and router (SC&R) 508. A card controller 514 may also be provided, and coupled to one or more components of the output card 104. In some cases, card controller 514 may couple to the master controller 108, via backplane 112, or to an external controller. In other cases, controller 514 may operate autonomously, without connecting to any secondary controllers.

As shown, output card 104 may receive media streams through one or more input terminals 120, connected to backplane 112. Output card 104 may also receive media streams through a separate input module 510. In various cases, input module 510 may couple-directly or indirectly—to one or more upstream media devices. The upstream devices may transmit media streams to the input module 510 over an IP transmission interface. Accordingly, the input module 510 can include one or more optical ports (e.g., QFSP ports) which couple to fiber optic cables carrying transmitted IP streams. The media streams received at the input module 510 can include, for example, compressed video content. The video content can be de-compressed by output card 104 and either returned back to the transmitting media device, or further transmitted to another downstream device. In this manner, output card 104 can operate as an "on-demand" video de-compressor.

Media streams received at the output card 104 may be transmitted through a feed forward 502. Feed forward 502 operates generally similar to feed forward 404 of input card 102. In particular, feed forward 502 can limit the number (e.g., quantity), or type, of incoming media streams being passed through the output card 104. For example, feed forward 502 may pass only a single incoming stream at a time, or otherwise, multiple associated streams at a time (e.g., compressed or uncompressed video, and associated audio and metadata streams). In some cases, feed forward 502 can switch between passing streams received from backplane 112, and streams received via input module 510. Similar to feed forward 404 in input card 102, feed forward 502 can also include a memory buffer 503. Memory buffer 503 may temporarily store incoming streams which are not immediately passed through by the feed forward 502. Memory buffer 503 can also temporarily hold incoming streams, so that all associated streams are received and synchronized to a common time base (e.g., via genlock or PTP).

The operation of the feed forward 502 may be controlled, in some cases, by card controller 514. For example, card controller 514 may control which streams are passed through by the feed forward 502. Similar to input card controller 414, output card controller 514 can control the operation of feed forward 502 by tapping incoming streams at input terminals 120 and/or input module 510. Controller 514 may then analyze the tapped signals to determine which signals to pass. For example, controller 514 may analyze tapped signals to determine one or more associated streams (e.g., media, audio and metadata). This can be determined, for example, by analyzing the content of the tapped stream to determine an associated relationship. In other cases, controller 514 can determine an associated relationship based on the input terminal 120 receiving the streams. For instance, a common input terminal 120 can be used to receive multiple associated input streams, or otherwise, a number of pre-designated input terminals 120 may receive associated streams. In still other cases, controller 514 can determine the input card 102 and/or source device transmitting the streams to determine an associated relationship between media stream. For example, controller 514 may communicate with master controller 108 (or an external controller) to determine the streams' routing paths, and determine that the streams are transmitted from a common source and are otherwise associated. In still yet other cases, streams received at one or more input terminals at the same time can be determined to be associated. In any alternative case, once an associated relationship is determined by controller 514, controller 514 may appropriately instruct the feed forward 502 to pass through the streams together.

Card controller 514 can also instruct the feed forward 502 as to which streams to pass through having regard to a number of other considerations including, for example, the processing capacity of output card 104 (e.g., as determined by monitoring traffic through one or more components of output card 104), the processing capacity of downstream devices coupled to the output card 104 (e.g., as determined by requesting, or receiving processing information—directly or indirectly—from connected downstream devices), the processing priority of a media stream (e.g., as indicated, for example, by the metadata content including priority information, or otherwise, as determined based on the specific source or destination devices transmitting or receiving the media streams). Accordingly, it will be appreciated that numerous factors may be considered by the card controller 514 in determining how to prioritize passing of media streams through feed forward 502.

As shown in the illustrated embodiment, output card 104 may also include a de-multiplexer 504. De-multiplexer 504 can receive media streams transmitted by the feed forward 502, and in cases where the received signal is a multiplexed signal (e.g., multiplexing compressed or uncompressed video, audio and/or metadata content), the de-multiplexer 504 can de-multiplex the received signal into separate signal components.

In the illustrated example in FIG. 5, a multiplexed signal 452 may be received at the de-multiplexer 504. The multiplexed signal 452 can be generated by an input card 102 or an upstream media device, and can contain at least a compressed video component 450cv, as well as one or more audio and metadata components. The de-multiplexer may de-multiplex the signal 452 to separate the compressed video component 450cv, from the audio component 450a and/or metadata components 450m. The compressed video stream 450cv may then be transmitted to a video decompression module 506, while the media and audio streams may be transmitted around the decompression module 506.

In cases where the multiplexed signal 452 includes uncompressed video (e.g., low bandwidth uncompressed video 450v-l), the de-multiplexer 504 may either refrain from de-multiplexing the signal 452 and pass the entire signal around the decompression module 506. In other cases, the signal may still be de-multiplexed, and each stream component transmitted around de-compression module 506. In some cases, the incoming stream may not be a multiplexed signal, but can be a single media stream (e.g., video, audio or metadata). In these cases, the media stream may not require de-multiplexing, and accordingly, can be transmitted either directly to the video compression module 506 (e.g., in cases where the stream is a compressed video stream), or around the de-compression module 506.

In at least some embodiments, card controller 514 can control the operation of de-multiplexer 504. For example, controller 514 can control whether the de-multiplexer 504 performs a de-multiplexing operation on an incoming signal, and additionally, where to route streams generated by the de-multiplexing. In some cases, for example, controller 514 can tap incoming signals—either at input terminals 120, input module 510, at the feed forward 502 or directly at the de-multiplexer 504—and analyze each signal (e.g., signal content) to determine if the signal is a multiplexed signal, and whether the multiplexed signal includes a compressed video component. Based on this determination, the controller 514 can instruct the de-multiplexer 504 whether or not to de-multiplex the signal.

In other cases, controller 514 can determine whether a signal requires de-multiplexing based on the input cards 102 and/or specific external media devices which are transmitting the media stream. For example, specific input cards 102 or external media devices may be known to transmit multiplexed signals having compressed video content. In some cases, controller 514 can communicate with the relevant input card 102 or external media device to determine the nature of media stream transmitted.

It will be appreciated that, in other embodiments, streams which do not require de-multiplexing can be immediately routed around the de-multiplexer 504. For example, a separate transmission line may be provided to directly route streams from input terminals 120, 122 and/or feed-forward 502 around the de-multiplexer 504. The streams can either be directly routed to the SC&R 508, or in the case of a compressed video stream 450cv, to the video decompression module 506. This routing may be automatic (e.g., streams received from pre-designated input terminals can be directly around the de-multiplexer 504), or can be controlled by the card controller 514 (e.g., card controller 514 can control feed-forward 502 to route streams, which do not require de-multiplexing, around the de-multiplexer 504). In other embodiments, the output card 104 may not include a de-multiplexer 504. For example, some output cards 104 can be designated to receive only non-multiplexed media streams. This designation can occur, for example, by master controller 108 (or an external controller) controlling routing through cross-point cards 106. Accordingly, in these cases, a de-multiplexer 504 is not required inside the output card 104.

Video decompression module 506 receives low bandwidth compressed video streams 450cv, and applies a de-compression scheme to recover a high bandwidth uncompressed video stream 450v. In various cases, the low bandwidth video streams 450cv may be video streams which either have a bandwidth less than, or equal to the card bandwidth limit of one or more cross-point cards 106, or otherwise a bandwidth lower than a pre-determined limit. Any suitable de-compression scheme can be used by the decompression module 506 (e.g., JPEG, Dirac, MPEG decompression).

In some embodiments, the decompression module 506 may be pre-configured to implement only a single type of decompression scheme. In these embodiments, the output card 104 may only receive video streams 450cv which are compressed using a compression scheme corresponding to the de-compression scheme used by module 506. For instance, cross-point cards 106 can transmit compressed video streams 450cv from input cards 102 to designated output cards 104 having regard to the complementary compression/de-compression schemes used at each card. In other cases, master controller 108 (or an external controller) can control the switch configuration of cross-point cards 106 to ensure that compressed video streams 450cv generated by specific input cards 102 are routed to specific output cards 104 using a complementary decompression scheme. In still other cases, output card controller 514 can transmit a request to master controller 108 (or an external controller), or cross-point card controllers 310 to only receive video streams compressed according to a specific compression standard.

In other cases, the decompression module 506 can implement a number of variable decompression schemes. For example, the decompression module 506 can apply an appropriate decompression scheme, having regard to the particular type of compression used for generating the received compressed video stream 450cv. In this manner, the output card 104 can process a larger array of incoming compressed video streams.

In cases where the decompression module 506 applies more than one decompression scheme, the decompression module 506 can be controlled by the card controller 514. For example, card controller 514 can determine a suitable decompression scheme to apply at decompression module 506 by analyzing a copy of the received compressed video signal 450cv, or associated metadata. Based on the analysis, the card controller 514 can determine the compression algorithm used to generate the compressed video stream 450cv, and by extension, the appropriate decompression scheme for video compression module 506.

In other cases, the card controller 514 can determine a suitable decompression scheme by determining which input card 102 or source device generated the compressed video stream 450cv. For example, card controller 514 may recognize that specific input cards 102 or source devices transmit video streams compressed according to specific compression standards. In other cases, card controller 514 can communicate with the relevant input card controller 414 and/or source device-directly, or indirectly via the master controller 108 (or an external controller)—to determine the compression standard used. In still other cases, this information can be supplied by the master controller 108 (or an external controller). For example, the master controller 108 can track or monitor the input card 102 transmitting the media stream, as well as the compression standard used, and provide this information to the decompression module 506 automatically, or upon request.

The uncompressed video stream (e.g., a high bandwidth uncompressed video stream 450v-h) generated by the decompression module 506 may then be transmitted to the signal combiner and router (SC&R) 508.

SC&R 508 combines media streams for transmission and/or routing to further downstream devices. For example, SC&R 508 can be used to combine an uncompressed video stream 450v-h—generated by video compression module 506—with one or more associated audio and/or metadata streams 450a, 450m. The SC&R 508 can combine the associated streams for transmission using an SDI interface (e.g., a 3G, 6G, 12G SDI single or multi-link). For example, the SC&R 508 can embed the associated audio content 450a or metadata content 450m with the associated uncompressed video content stream for SDI transmission. In other cases, the SC&R 508 may not combine incoming signals, but may simple pass-forward incoming media streams. For example, associated media streams may be configured for separate transmission over IP (e.g., SMPTE 2110 IP transmission standard), in which case the signals do not require combining.

As shown, SC&R 508 can include a memory buffer 509 for temporarily storing incoming streams. In some cases, memory buffer 509 can be used for temporarily holding incoming streams, which requiring combining or simultaneous transmission, until all relevant streams are received at the SC&R 508. For example, in some cases, processing delay resulting from decompression module 506 can result in an uncompressed video signal 450v-h being received after the associated audio and/or metadata stream. In these cases, the audio and metadata streams are held in the memory buffer 509 until the corresponding uncompressed video stream is also received.

In at least some embodiments, signal combiner 508 may operate based on instructions received from card controller 514. For example, controller 514 can instruct the signal combiner 508 whether to combine signals, and which signals to combine. This determination can be made, for example, based on whether the streams will be transmitted using an SDI or IP interface.

The determination as to whether to combine streams for SDI transmission, or otherwise, separately transmit streams over IP, can be based on a number of considerations. For instance, the determination can be based on the initial transmission format the streams were received at the input card 102 (e.g., SDI or IP). For example, in cases where the streams were received using an SDI or IP interface at input cards 102, the output card 104 can transmit the streams using the same type of interface. The initial transmission format at the input card 102 can be determined by controller 514, for example, by communicating—directly, or indirectly via master controller 108 (or an external controller)—with the input card 102 transmitting the media stream to output card 104. In other cases, the transmission format may also be determined, for example, by analyzing associated metadata (e.g., the metadata may contain information about the transmission standard). In still other cases, the determination can be made having regard to the requirements of downstream devices receiving the media streams. For example, specific downstream devices may receive only SDI or IP streams. The requirements of downstream devices can be determined using known requirement information of downstream devices receiving the media streams. For example, output card 104 may couple to pre-designated downstream devices having transmission interface requirements known to the controller 514. In other cases, controller 514 can analyze a media stream (e.g., or associated metadata) to determine a destination device, and based on the determination, identify known transmission interface requirements.

It will be appreciated that, in some cases, it may not be required to combine signals inside the output card 104. For example, this may be the case where the output card 104 only transmits signals using an IP transmission interface. In these cases, the output card 104 may not necessarily require a signal combiner 508.

Output card 104 also includes one or more output modules 512. The output modules 512 are configured to transmit media streams to downstream devices. The output modules 512 can include one or more of an SDI output modules 512a which receives SDI signals from SC&R 508, and an IP output module 512b which receives IP signals from SC&R 508. SDI output module 512a and IP output module 512b are generally analogous to SDI input module 402a and IP input module 402b of input card 102 in that they provide an interface to connect SDI or IP links carrying signals to downstream devices. In particular, each output module 512 can include one or more output terminals 124 which couple to one or more downstream devices for transmitting media streams thereto.

Similar to input card 102, it will be appreciated that while a card controller 514 has been described herein as providing certain functions in the output card 104, in various embodiments, the functions performed by the card controller 514 can also be distributed between the card controller 514 and other secondary controllers (e.g., the master controller 108 or an external controller). In other words, some of the functions described herein with respect to the card controller 514 may be performed by a master controller 108 (or an external controller) in communication with card controller 514. Further, in other embodiments, a card controller 514 may not be necessarily provided inside of the output card 104. For example, in some cases, each component of the output card 104 may be pre-configured to operate autonomously, without intervention of a card controller 514. In other cases, the components of the output card 104 may couple directly to the master controller 108, or to an external controller, which can directly control the functions of the various output card components. It will be appreciated that an advantage of including a card controller 514 inside output card 104 is to provide for a more decentralized routing system wherein each output card 104 is able to operate flexibly to respond to different input signals and return desired output signals.

It will also be appreciated that while the output card 104 has been illustrated with only a single instance of each type of component (e.g., de-multiplexer 504, decompression module 506, etc.), in other embodiments, the output card 104 may include a plurality of each type of component. For example, output card 104 can include a plurality of input modules 510, feed-forwards 502, de-multiplexers 504, video compression modules 506, etc. This can allow, for example, the output card 104 to receive and simultaneously process a greater number of incoming media streams.

Figure 6:
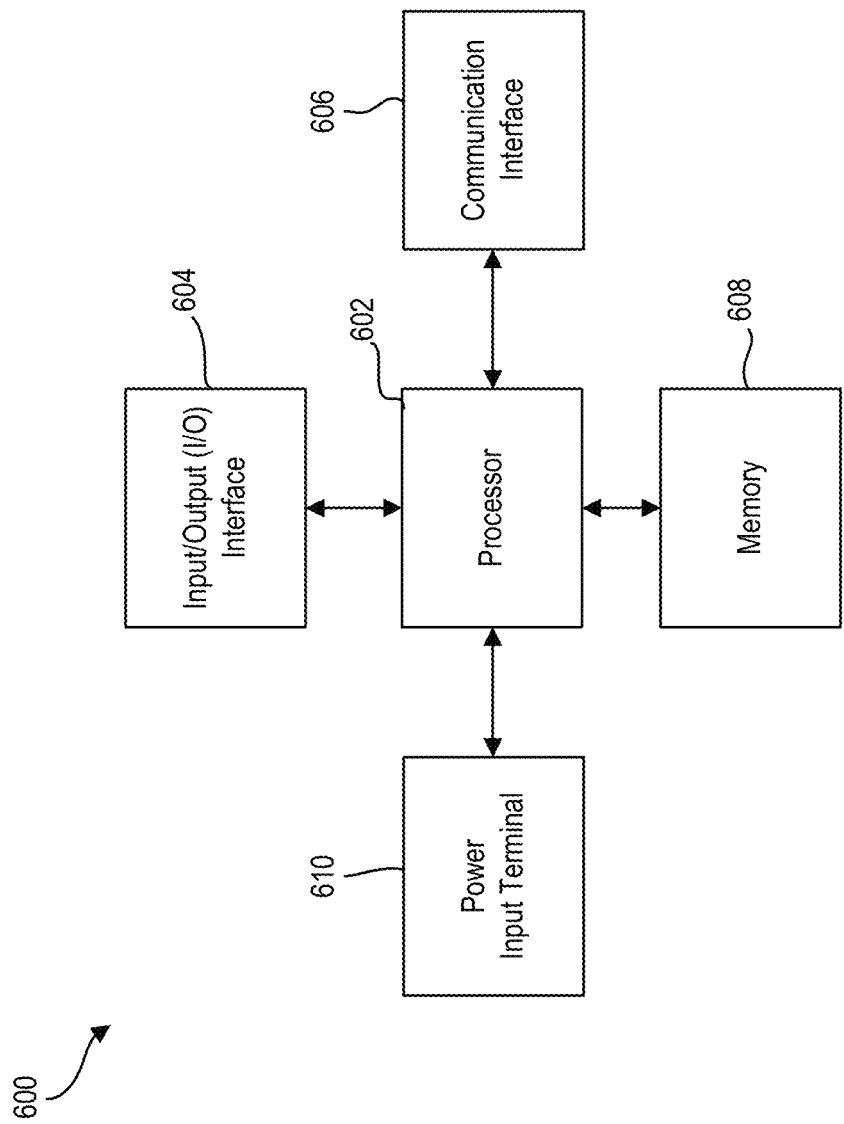
FIG. 6 is a simplified block diagram of an example controller, according to some embodiments.

Referring now to FIG. 6, there is shown a simplified block diagram of an example controller 600, according to some embodiments. Controller 600 may correspond to any one of master controller 108 of router 100, card controller 310 of a cross-point card 106, card controller 414 of input card 102, card controller 514 of output card 104 or an external controller.

As shown, controller 600 can include a processor 602 coupled to one or more of an input/output (I/O) interface 604, a communication interface 606, a memory 608 and a power input terminal 610.

Processor 602 is a computer processor, such as a general purpose microprocessor. In some other cases, processor 602 may be a field programmable gate array, application specific integrated circuit, microcontroller, or other suitable computer processor.

Input/output (I/O) interface 604 can be used for coupling the controller 600 to various external components. For example, in cases where controller 600 corresponds to the input card controller 414 or output card controller 514, I/O interface 604 can couple to various components of the respective input and output cards in order to transmit and receive data from these components. The I/O interface 604 can also be used for coupling to the backplane 112 to communicate with other elements of the router 100 (e.g., master controller 108). Similarly, where controller 600 corresponds to the master controller 108, I/O interface 604 can couple to various input and output card controller 414, 514 as well as to various cross-point card controllers 310, via backplane 112.

Communication interface 606 is one or more data network interfaces, such as an IEEE 802.3 or IEEE 802.11 interface, for communication over a network. In various cases, the communication interface 606 can be used by the master controller 108, cross-point card controller 310, input card controller 414 or output card controller 514 to communicate with an external controller. In some cases, the external controller may be providing user-inputs to the various controllers inside of router 100.

Processor 602 is coupled, via a computer data bus, to memory 608. Memory 608 may include both volatile and non-volatile memory. Non-volatile memory stores computer programs consisting of computer-executable instructions, which may be loaded into volatile memory for execution by processor 602 as needed. It will be understood by those of skill in the art that references herein to a controller as carrying out a function or acting in a particular way imply that processor 602 of the controller is executing instructions (e.g., a software program) stored in memory 608 and possibly transmitting or receiving inputs and outputs via one or more interface. Memory 608 may also store data input to, or output from, processor 602 in the course of executing the computer-executable instructions. In various cases, where controller 600 corresponds to an input card controller 414 or output card controller 514, memory 608 can store various instructions for controlling the operation of the various components and elements of the input or output cards, respectively, as provided herein. Similarly, in cases where controller 600 corresponds to master controller 108, memory 608 can store instructions for controlling the various components and elements of router 100.

Power input terminal 610 may be any suitable terminal for receiving power to power the controller 600. In some cases, power received from power input terminal 610 may be transmitted, via the I/O interface 604, to other components connected to the controller 600. In some cases, the power input terminal 610 may be coupled to an external power source, or an on-board power source (e.g., batteries).

Figure 7:
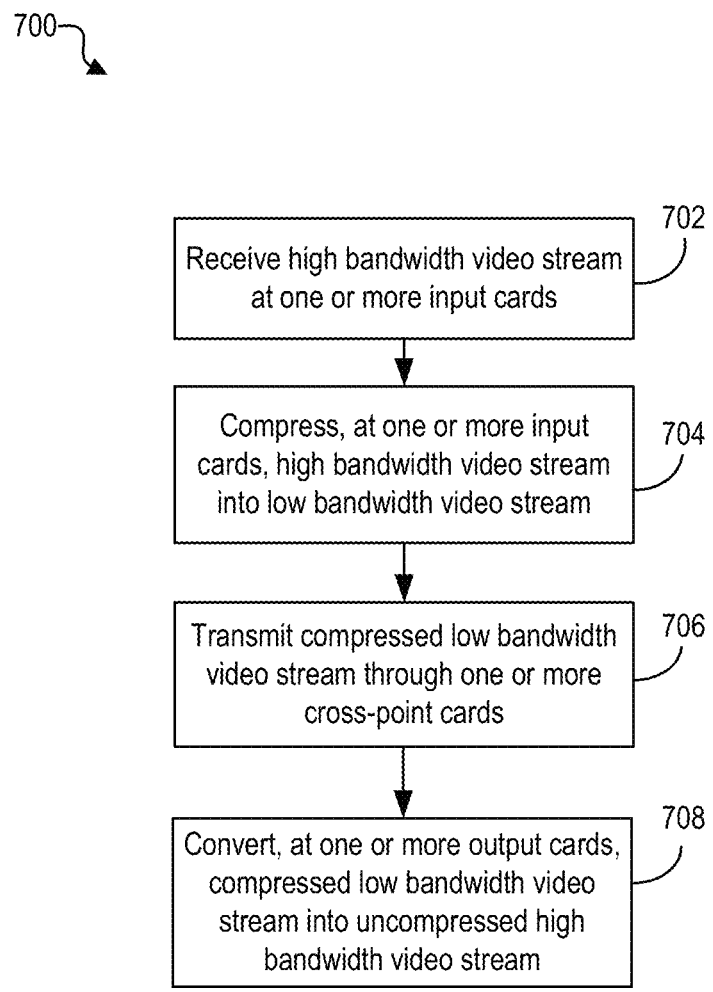
FIG. 7 is an example process flow for a method for down-sampled routing of video streams, according to some embodiments.

Reference is now made to FIG. 7, which illustrates an example process flow for a method 700 for down-sampled video routing. The method 700 can be performed, for example, by router 100 of FIGS. 1 and 2.

At 702, router 100 may receive, at an input card 102, a media stream containing a high bandwidth video signal. By way of non-limiting examples, the media stream may be an SDI or IP signal carrying a 6G, 12G, or 48G bandwidth video stream. In various cases, the high bandwidth video signal may be a video signal having a bandwidth greater than a card bandwidth limit of one or more cross-point cards 106 included in the router 100. In other cases, the high bandwidth video signal may be a video signal having a greater than desirable bandwidth.

At 704, the input card 102 can be used to compress the high bandwidth video stream portion of the media stream to generate a compressed low bandwidth video stream. In various cases, the low bandwidth video stream may have a bandwidth which is less than, or equal to, a card bandwidth limit of one or more cross-point cards 106 of the router 100. In other cases, a low bandwidth video stream can refer to a video stream having a sufficiently low desired bandwidth.

At 706, the compressed video stream can be transmitted and routed through one or more cross-point cards 106 of the router 100.

At 708, the routed compressed video stream can be received at an output card 104, and de-compressed to recover the uncompressed video stream. In other words, the output card 104 can generate a recovered uncompressed video stream that may have a bandwidth greater than a card bandwidth limit of one or more cross-point cards 106 of router 100, or otherwise, having a desirably higher bandwidth. The recovered uncompressed video stream may then be transmitted, alone or with associated media streams, to one or more downstream devices.

Figure 8:
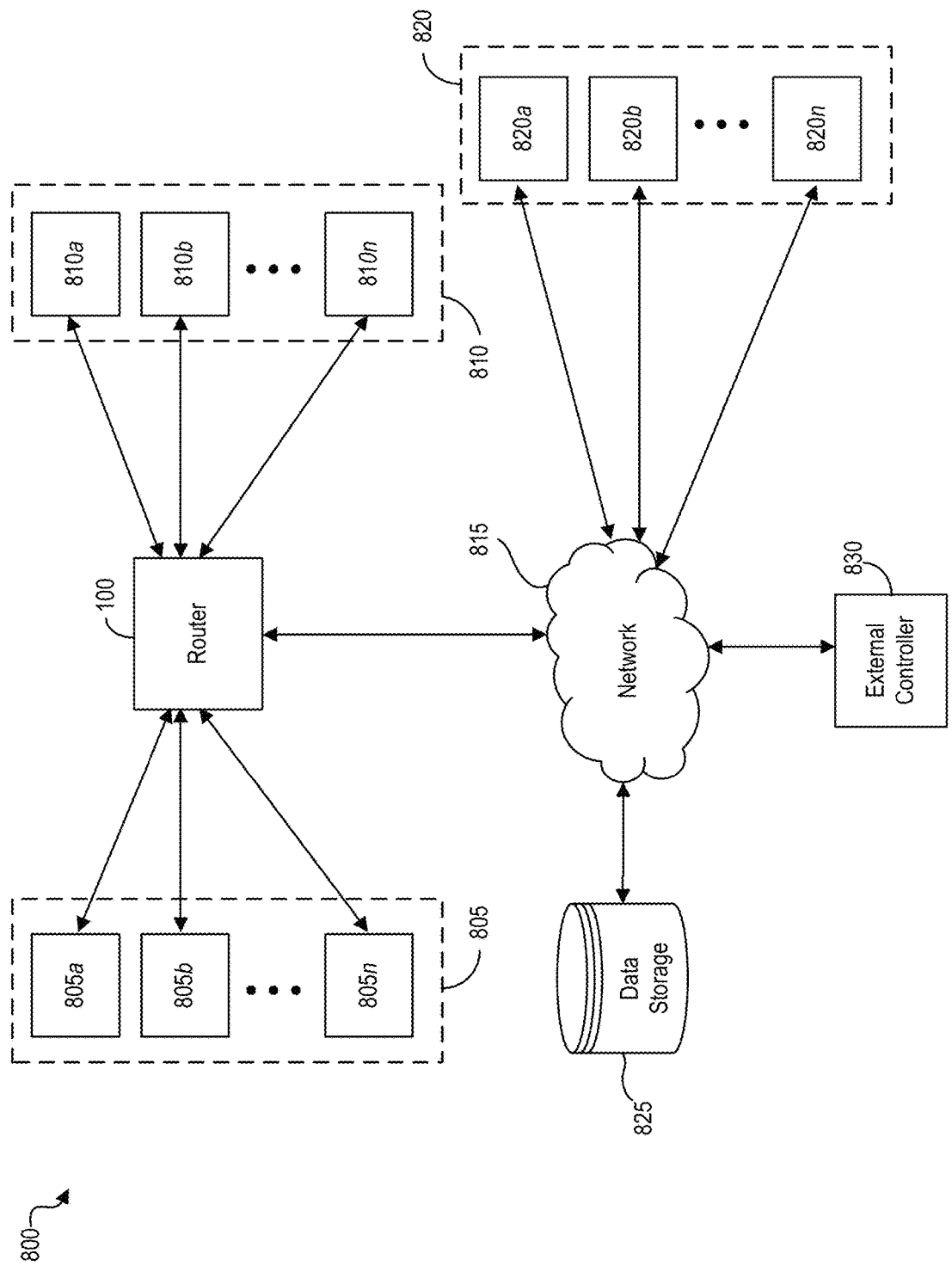
FIG. 8 is an example system for down-sampled video routing, according to some embodiments.

Referring now to FIG. 8, there is shown an example system 800 for down sampled video routing signals.

System 800 generally includes a router 100 in communication, with one or more first media devices 805a-805n and one or more second media device 810a-810n.

In various cases, router 100 can be operable to route signals between the first and second media devices 805, 810. First media devices 805 can comprise, for example, one or more media source devices (e.g., cameras, microphones) for generating media streams. First media devices may also include one or more intermediate media processing devices (e.g., video and audio synchronization or equalization modules). The first media devices 805 can be coupled to one or more input cards 102 of the router 100. Media streams transmitted by the first media devices 805 can be received by input cards 102 of router 100 and routed, via one or more cross-point cards 106, to one or more designated second media devices 810. Second media devices 810 can include, for example, further intermediate media processing devices, or otherwise, destination devices for receiving the media streams (e.g., multi-viewers for displaying video). The second media devices 810 can be coupled, for example, to one or more output cards 104 of router 100. The first and second media devices 805, 810 may be connected to the input and output cards of router 100 via SDI links (e.g., single or multi-link SDI).

In various cases, media streams received by router 100 from first media devices 805 can include one or more high bandwidth video components (e.g., 6G, 12G, 48G bandwidth video signals). For example, this can include video components having a bandwidth greater than a card bandwidth limit of one or more cross-point cards 106 of router 100. Accordingly, upon receiving the media streams, input cards 102 of router 100 may compress the video signal to generate one or more compressed low bandwidth video signals (e.g., 3G signals). In some cases, the compressed low bandwidth video signals can have a bandwidth that is less than or equal to card bandwidth limit of one or more cross-point cards 106 inside the router 100. The compressed video signals may then be internally routed, along with associated streams (e.g., audio and/or metadata), through one or more cross-point cards 106 of router 100 having limited routing bandwidth capacity. An output card 104, of the router 100, may receive the compressed video signal, and may de-compress the video component. That is, the output card 104 may de-compress the video component to have a bandwidth greater than card bandwidth limit of one or more cross-point cards 106. The de-compressed video, along with the associated media streams, may then be forwarded to one or more second media devices 810.

System 800 may also include one or more third media devices 820a-820n which are connected to router 100 via network 815.

Network 815 can comprise, for example, an Internet Protocol (IP) network, and can include multiple network paths, as well as one or more network switches that configure the one or more network paths to route data streams between router 100 and third media devices 820. In some embodiments, network 815 can be a software defined network (SDN), which includes a data plane and a separate control plane. The data plane can include network switches and routing nodes which route data streams to different devices. The control plane can include one or more controllers (e.g., SDN controllers) to control the data plane. The one or more SDN controls can control network switches to route data streams to different devices, inside, or outside, system 800.

Third media devices 820 may comprise one or more media source devices, media destination devices and/or intermediate media processing devices. In various cases, the third media devices 820 may transmit, for routing, media streams over IP using network 815 (e.g., media streams transmitted using an SMPTE 2110 IP standard). In some cases, the media streams may include one or more high bandwidth video streams (e.g., video streams having a bandwidth greater than a card bandwidth limit of one or more cross-point cards 106 of router 100). The media streams can be received by one or more input cards 102 of the router 100. The media streams may be internally routed and transmitted to one or more second media devices 810 using an SDI transmission interface. In other cases, the router 100 can also internally route the signals received from media devices 805 and 810, and transmit the signals, over IP network 815, to one or more further third media devices 820. It will now be appreciated that the ability of router 100 to receive and transmit both SDI and IP signals allows the router 100 to seamlessly co-habit within both an SDI and IP domain.

In some embodiments, as explained previously, input cards 102 of router 100 may operate as "on-demand" video compression modules, which receive uncompressed high bandwidth video signals either over SDI from one or more first media devices 805, or over IP from one or more third media devices 820. The received uncompressed video streams may be compressed by a compression module of the input card 102. Once compressed, the input card 102 can transmit the compressed video signals (as well as associated media streams) over IP network 815 to one or more of the third media devices 820.

Similarly, output cards 104 of router 100 may also operate as "on-demand" video de-compression devices. In particular, output cards 104 can receive compressed video streams over SDI, from one or more second media devices 810, or over IP from one or more third media devices 820. A de-compression module of the output card 104 can de-compress the video streams. The de-compressed video, along with associated media streams, can be transmitted over SDI to a second media device 810, or over IP to one of the third media device 820.

In various cases, router 100 may also be connected, over network 815, to a data storage 825 and/or an external controller 830.

Data storage 825 can include one or more computer servers, each of which can include a storage memory, a processor and a network interface. The storage memory can comprise a random access memory (RAM), a read-only memory (ROM), an erasable programmable read-only memory (EPROM, EEPROM or Flash memory), one or more hard drives or other suitable data storage elements. The data storage 825 can also be a cloud storage and can include a number of servers, or computer nodes connected via network 815.

In various cases, data storage 825 can store (e.g., archive) media streams which may require routing, by router 100, at a subsequent point in time. In some cases, data storage 825 can also store uncompressed high bandwidth video signals that may require compression at a subsequent point in time by one or more input cards 102 of router 100. In still other cases, data storage 825 can store compressed video signals which may require processing, routing or de-compression by an output card 104 of router 100 at a subsequent time.

External controller 830 may be a controller for remote controlling of router 100. For example, external controller 830 can be used for remotely controlling the operations of one or more input cards 102, output cards 104, cross-point cards 106 or master controller 108 of router 100. In some cases, external controller 830 may receive user-inputs with respect to controlling the operation of one or more components of router 100.

The present invention has been described here by way of example only. Various modification and variations may be made to these exemplary embodiments without departing from the spirit and scope of the invention, which is limited only by the appended claims.

The invention claimed is:

1. A media router for down-sampled video routing, comprising:
   a backplane including a plurality of backplane connections;
   at least one input card, comprising:
      one or more input terminals to receive at least one high bandwidth video signal;
      at least one compression module to compress the at least one high bandwidth video signal to generate at least one low bandwidth video signal in accordance with a compression scheme; and
      one or more output terminals being electrically coupled to the backplane, and configured to transmit the at least one low bandwidth video signal to the backplane;
   a plurality of cross-point cards, each comprising:
      one or more input ports coupled to the backplane to receive the at least one low bandwidth video signal generated by the at least one input card;
      one or more output ports coupled to the backplane to transmit the at least one low bandwidth video signal; and
      a cross-point switch for routing the at least one low bandwidth video signal between the one or more input ports and a designated output port, of the one or more output ports;
   at least one output card, comprising:
      one or more input ports coupled to the backplane to receive the at least one low bandwidth video signal from a cross-point card;
      at least one decompression module for converting the received at least one low bandwidth video signal into at least one recovered high bandwidth uncompressed video signal in accordance with a decompression scheme corresponding to the compression scheme; and
      one or more output ports for transmitting the at least one recovered high bandwidth uncompressed video signal; and
   a controller coupled to each of the at least one input card, the at least one output card, and the at least one cross-point card, the controller configured to:
      analyze the at least one high bandwidth video signal to determine a bandwidth of the at least one high bandwidth video signal;
      determine a compression capability of the at least one compression module of the at least one input card;
      determine a card bandwidth limit of the at least one cross point card along a routing path of the at least one low bandwidth video signal;
      if the compression capability of the at least one compression module is insufficient for the card bandwidth limit of the at least one crosspoint card, modify the routing path of the at least one low bandwidth video signal.

2. The media router of claim 1, wherein the bandwidth of the at least one high bandwidth video signal is greater than the card bandwidth limit, and the low bandwidth video signal has a bandwidth less than or equal to the card bandwidth limit.

3. The media router of claim 1, wherein the card bandwidth limit is approximately in a range of 3 Gbit/s to 3.5 Gbits/s.

4. The media router of claim 1, wherein the compression scheme is a visually lossless video compression scheme.

5. The media router of claim 4, wherein the compression scheme comprises at least one of a JPEG XS, JPEG2000, HT-J2K, JPEG-LS, H.264/MPEG-4 AVC and Dirac compression scheme.

6. The media router of claim 1, wherein the at least one high bandwidth video signal and the uncompressed video signal each comprise at least one of an SDI or an IP signal.

7. The media router of claim 1, wherein the at least one input card is further configured to transmit the at least one low bandwidth video signal to at least one downstream device.

8. The media router of claim 1, wherein the at least one output card is configured to receive the compressed video from an upstream device.

9. A method for down-sampled video routing using a media router, comprising:
  receiving, by at least one input card, at least one high bandwidth video signal;
  analyzing, by a controller, the at least one high bandwidth video signal to determine a bandwidth of the at least one high bandwidth video signal;
  compressing, by a compression module of the at least one input card, the at least one high bandwidth video signal to generate at least one low bandwidth compressed video signal in accordance with a compression scheme;
  determining, by the controller, a compression capability of the compression module of the at least one input card;
  transmitting the at least one low bandwidth video signal through at least one cross-point card of a plurality of cross-point cards to at least one output card, wherein each of the plurality of cross-point cards has a card bandwidth limit;
  determining, by the controller, a card bandwidth limit of the at least one cross point card along a routing path of the at least one low bandwidth video signal;
  if the compression capability of the at least one compression module is insufficient for the card bandwidth limit of the at least one crosspoint card, modifying, by the controller, the routing path of the at least one low bandwidth video signal;
  receiving, by the at least one output card, the at least one low bandwidth video signal; and
  de-compressing, by a decompression module of the at least one output card, the at least one low bandwidth video signal to generate at least one recovered high bandwidth uncompressed video signal in accordance with a decompression scheme corresponding to the compression scheme.

10. The method of claim 9, wherein the bandwidth of the at least one high bandwidth video signal is greater than the card bandwidth limit, and the low bandwidth video signal has a bandwidth less than or equal to the card bandwidth limit.

11. The method of claim 9, wherein the card bandwidth limit is approximately in a range of 3 Gbit/s to 3.5 Gbits/s.

12. The method of claim 9, wherein the compression scheme is a visually lossless video compression scheme.

13. The method of claim 12, wherein the compression scheme comprises at least one of a JPEG XS, JPEG2000, HT-J2K, JPEG-LS, H.264/MPEG-4 AVC and Dirac compression scheme.

14. The method of claim 9, wherein the at least one high bandwidth video signal and the uncompressed video signal each comprise at least one of an SDI or an IP signal.

15. The method of claim 9, wherein the method further comprises transmitting, by the at least one input card, the at least one low bandwidth video signal, to at least one downstream device.

16. The method of claim 9, wherein the method further comprises receiving, by the at least one output card, the compressed video from an upstream device.

* * * * *